(12) United States Patent
Shen et al.

(10) Patent No.: US 7,814,179 B2
(45) Date of Patent: Oct. 12, 2010

(54) INTERFACE BETWEEN MOBILE CONNECTIVITY SERVICE AND WWAN DEVICE

(75) Inventors: Alan Walter Shen, Seattle, WA (US); Hao Zhuang, Sammamish, WA (US); Dan A. Knudson, Redmond, WA (US); Warren V. Barkley, Mill Creek, WA (US); Nagampalli S. S. Narasimha Rao, Kirkland, WA (US); Taroon Mandhana, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1797 days.

(21) Appl. No.: 10/749,796

(22) Filed: Dec. 31, 2003

(65) Prior Publication Data

US 2005/0090248 A1 Apr. 28, 2005

Related U.S. Application Data

(60) Provisional application No. 60/514,331, filed on Oct. 24, 2003.

(51) Int. Cl.
G06F 15/177 (2006.01)
(52) U.S. Cl. .................. 709/220; 709/223; 709/230; 709/250
(58) Field of Classification Search .......... 709/220, 709/222, 223, 228, 230, 250
See application file for complete search history.

(56) References Cited

U.S. PATENT DOCUMENTS 6,157,965 A * 12/2000 Mohammed et al. ........ 709/222
6,421,728 B1 * 7/2002 Mohammed et al. ........ 709/227
6,629,151 B1 * 9/2003 Bahl ......................... 709/250
6,633,929 B1 10/2003 Hyder et al.
6,959,439 B1 * 10/2005 Boike ........................ 719/326
7,461,148 B1 * 12/2008 Beloussov et al. .......... 709/226
2005/0090248 A1 * 4/2005 Shen et al. ................ 455/432.1
2006/0242270 A1 * 10/2006 Sankaranarayan et al. .. 709/220
2007/0273589 A1 * 11/2007 Chen et al. ................. 343/702

FOREIGN PATENT DOCUMENTS

JP 09-179807 11/1997

OTHER PUBLICATIONS

"User-mode vs Kernel-mode Drivers", Mar. 1, 2003, TechNet Library, technet.microsoft.com.*
"Design Considerations for Wireless WAN Drivers for Windows", 7 pages, White Paper, Version 1.0, published Dec. 4, 2001; Microsoft Corporation, Redmond, WA (accessed on Dec. 30, 2003 http://www.microsoft.com/whdc/hwdev/tech/network/wireless/WirelessWANdrvrs.mspx).

(Continued)

Primary Examiner—Ramy M Osman
(74) Attorney, Agent, or Firm—Wolf, Greenfield & Sacks, P.C.

(57) ABSTRACT

Methods and systems are provided for an event-based configuration interface between a service supporting mobile connectivity and device drivers exposing WWAN data services. Object identifiers (OIDs) are passed between the service and the device drivers. Asynchronous communication is enabled. Methods and systems for using OIDs to negotiate configuration, including PINs, SIMs and signal strength, of WWAN devices such as GSM and CDMA-based devices are provided.

22 Claims, 11 Drawing Sheets

OTHER PUBLICATIONS

Official Notice of Rejection from Japanese Patent Application No. 2004-308912 mailed Dec. 11, 2009.
Partial European Search Report for EP 04022086.5 mailed Jun. 17, 2009.
PCCA "PCCA Standard—Extensions to NDIS for Wireless WANs" PCCA STD-201 Revision 1.1 dated Jul. 7, 2000, 32 pages.
PCCA STD-201 "PCCA— Extensions to NDIS for Wireless WANs Appendix C: CDPD Objects" Revision 1.1 dated Jul. 7, 2000, 13 pages.
PCCA STD-201 "PCCA—Extensions to NDIS for Wireless WANs Appendix E: Data TAC Objects" Revision 1.1 dated Jul. 7, 2000, 12 pages.
PCCA STD-201 "PCCA—Extensions to NDIS for Wireless WANs Appendix H: GPRS Objects" Revision 1.1 dated Jul. 7, 2000, 15 pages.
PCCA STD-201 "PCCA—Extensions to NDIS for Wireless WANs Appendix Index and Status" Revision 1.1 dated Jul. 7, 2000, 3 pages.
Ted Faison, Faison Computing Inc. "Interaction Patterns for Communicating Processes" Jul. 27, 1998, 35 pages.

* cited by examiner

INTERFACE BETWEEN MOBILE CONNECTIVITY SERVICE AND WWAN DEVICE

CROSS-REFERENCE TO RELATED APPLICATION

The present application claims the benefit of Shen, et al., U.S. Provisional Patent Application No. 60/514,331 entitled, "NDIS WWAN INTERFACE", filed on Oct. 24, 2003, which is hereby incorporated by reference in its entirety.

FIELD OF THE INVENTION

This invention pertains generally to the field of computer software-hardware interfaces, and particularly to interfaces between user-mode connectivity applications and kernel-mode WWAN device drivers.

BACKGROUND OF THE INVENTION

Wireless Wide Area Networks (WWANs, better known as cellular operators) allow computers to connect to networks employing WWAN protocols such as Global System Mobile (GSM), General Packet Radio Service (GPRS), Code Division Multiple Access (CDMA), etc. Although originally used for voice transmission, these networks can provide efficient data services to their end users, who have computers or other devices equipped with WWAN connection hardware.

Prior systems required individual WWAN hardware developers to provide custom configuration user interfaces for managing wireless data service over the WWAN. These interfaces allowed communication between user interfaces and WWAN devices, but their proprietary nature meant that a given user interface was compatible with only a specific WWAN device. Furthermore, user interfaces of previous systems often required users to configure connections through a highly manual process.

Previous systems additionally had the disadvantage of requiring synchronous communication between WWAN device drivers and their configuration user interfaces. If a WWAN device driver required a Personal Identification Number (PIN) in a prior system, for example, the PIN would have to be entered by the user, sent to the device driver, and processed by the device driver before any additional commands could be issued. The requirement of synchronous communication imposed by previous systems often resulted in lengthy periods for configuring WWAN devices, since configuration commands could only be sent when previous commands had been completed.

BRIEF SUMMARY OF THE INVENTION

Embodiments of the present invention provide methods and systems for an event-based configuration interface between a service supporting mobile connectivity (a "Roaming Service") and device drivers exposing WWAN data services. This interface is intended to provide the essential states and events for the Roaming Service with minimum user configuration.

In accordance with one aspect of the invention, a system is provided for using a user-mode module to kernel-mode driver interface to send commands to and receive information from a kernel-mode WWAN device driver by using OIDs. In one embodiment, the WWAN device driver controls a GSM-based device. In another embodiment, the WWAN device driver controls a CDMA-based device. In still another embodiment, the WWAN device driver controls a CDMA or GSM-based device.

In one embodiment, some OIDs are used for indicating to the user-mode entity that the WWAN device has been provisioned by a WWAN service provider. In another embodiment, some OIDs are used for authentication with information from a SIM. In yet another embodiment, some OIDs are used for authentication with a PIN. In one version, the PIN is used in conjunction with a voice call.

In one embodiment, some OIDs are used for managing a signal strength range threshold. In one version, some OIDs are used to establish a signal strength range threshold, and some OIDs are used for indicating that the signal strength is outside the established signal strength range threshold.

In one embodiment, some OIDs are used for managing a signal strength reporting interval. In one version, some OIDs are used to establish a signal strength reporting interval, and some OIDs are received at the minimum frequency of the established signal strength reporting interval.

In accordance with another aspect of the invention, a method is provided for managing the signal strength of a WWAN device using OIDs sent through a user-mode module to kernel-mode driver interface. In one embodiment, the method comprises sending an OID to establish a signal strength range threshold, and receiving an OID reporting a signal strength of the WWAN device that is outside the established signal strength range threshold. In another embodiment, the method further comprises sending an OID to adjust the signal strength range threshold. In yet another embodiment, the method further comprises determining, by a WWAN device driver in connection with the WWAN device, that the signal strength of the WWAN device is outside the established signal strength range threshold.

In accordance with another aspect of the invention, a method is provided for a user-mode entity to initialize a WWAN device driver using OIDs sent through a user-mode module to kernel-mode driver interface. In one embodiment, the method comprises sending and receiving OIDs to query the device driver in connection with the WWAN device for information about media supported by the device, sending an OID to set a range of configuration service versions supported by the user-mode entity, sending and receiving OIDs to query the device driver for a range of configuration service versions supported by the device driver, and sending and receiving OIDs to query the device driver for capabilities of the device driver. In one embodiment, the WWAN device driver controls a GSM-based device. In another embodiment, the WWAN device driver controls a CDMA-based device.

In accordance with another aspect of the invention, a method is provided for a user-mode entity to initialize a WWAN device using OIDs sent through a user-mode module to kernel-mode driver interface. In one embodiment, the method comprises initializing a device driver in connection with the WWAN device, sending an OID to initialize a protocol stack, receiving an OID indicating that the device driver is in a ready state, sending an OID to power a transceiver and attempt registration, sending an OID to establish a context, and receiving an OID indicating that the device is connected and ready for a communications session. In another embodiment, the method further comprises receiving an OID from the device driver indicating whether or not a PIN is required. In one version, the user-mode entity sends an OID containing a PIN if a PIN is required.

In one embodiment, the method further comprises receiving an OID indicating that the device driver is searching for a provider. In one version, the method further comprises receiving an OID indicating that the device driver has packet attached.

In one embodiment, the method further comprises sending an OID requesting a list of provisioned contexts. In one version, the method further comprises receiving an OID with a list of provisioned contexts.

In one embodiment, the WWAN device is a GSM-based device. In another embodiment, the WWAN device is a CDMA-based device.

BRIEF DESCRIPTION OF THE DRAWINGS

While the appended claims set forth the features of the present invention with particularity, the invention and its advantages are best understood from the following detailed description taken in conjunction with the accompanying drawings, of which:

DETAILED DESCRIPTION OF THE INVENTION

The methods and systems to interface between a service supporting mobile connectivity and device drivers exposing WWAN data services using OIDs will now be described with respect to preferred embodiments; however, the methods and systems of the present invention are not limited to interfaces between mobile connectivity services and device drivers. Moreover, the skilled artisan will readily appreciate that the methods and systems described herein are merely exemplary and that variations can be made without departing from the spirit and scope of the invention.

The present invention will be more completely understood through the following detailed description, which should be read in conjunction with the attached drawings. In this description, like numbers refer to similar elements within various embodiments of the present invention. The invention is illustrated as being implemented in a suitable computing environment. Although not required, the invention will be described in the general context of computer-executable instructions, such as procedures, being executed by a personal computer. Generally, procedures include program modules, routines, functions, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices. The term computer system may be used to refer to a system of computers such as may be found in a distributed computing environment.

Figure 1:
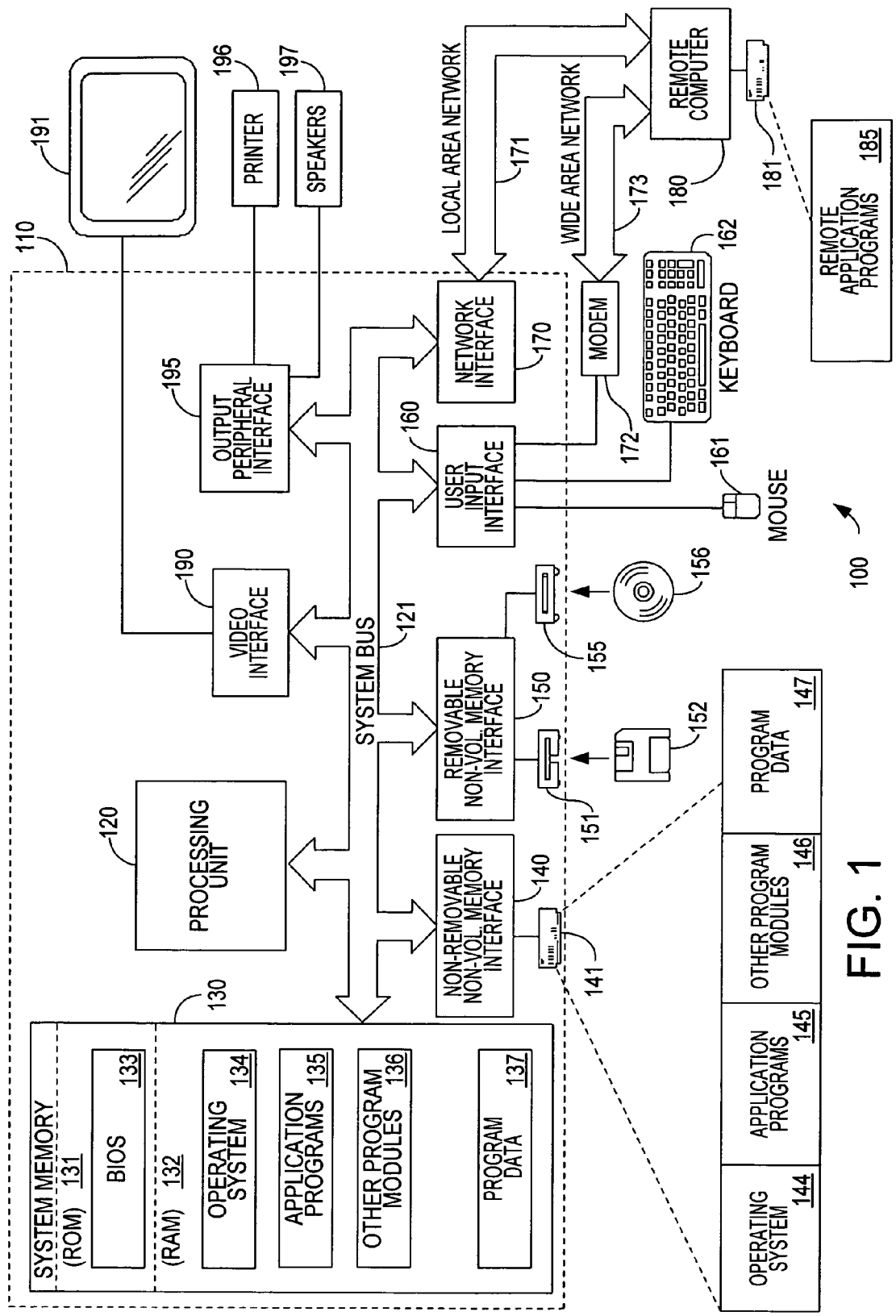
FIG. 1 is a simplified schematic illustrating an exemplary architecture of a computing device for carrying out configuration of WWAN devices in accordance with an embodiment of the present invention.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100. Although one embodiment of the invention does include each component illustrated in the exemplary operating environment 100, another more typical embodiment of the invention excludes non-essential components, for example, input/output devices other than those required for network communications.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer readable media. Computer readable media can be any available media that can be accessed by the computer 110 and includes both volatile and nonvolatile media, and removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers hereto illustrate that, at a minimum, they are different copies. A user may enter commands and information into the computer 110 through input devices such as a tablet, or electronic digitizer, 164, a microphone 163, a keyboard 162 and pointing device 161, commonly referred to as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 197 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet. For example, in the present invention, the computer 110 may comprise the source machine from which data is being migrated, and the remote computer 180 may comprise the destination machine. Note however that source and destination machines need not be connected by a network or any other means, but instead, data may be migrated via any media capable of being written by the source platform and read by the destination platform or platforms.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
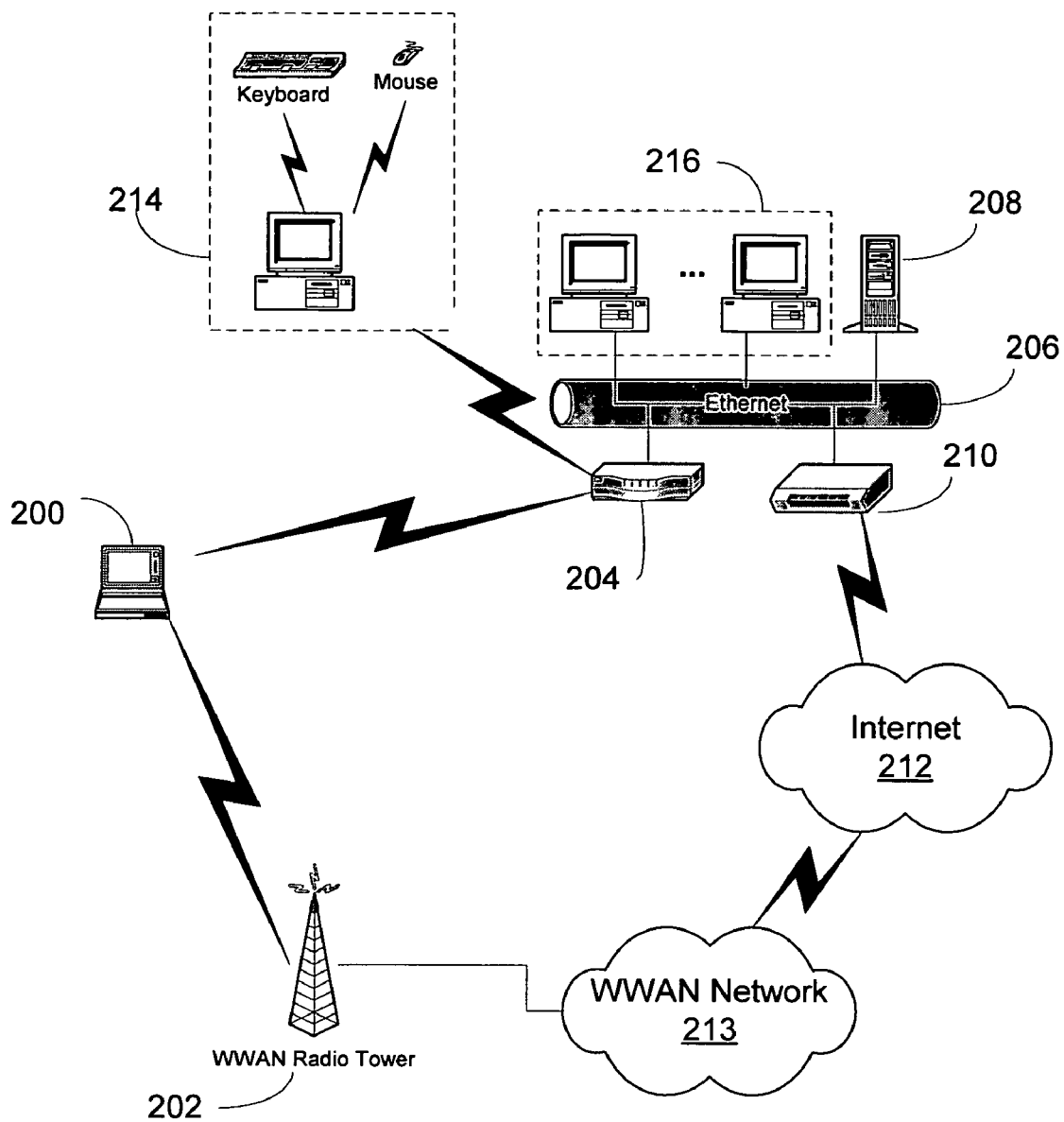
FIG. 2 is an exemplary multiple network communication media arrangement including multiple network access points to which a mobile computing device potentially connects.

The present invention is potentially incorporated into mobile and non-mobile computing devices/machines used in a variety of dynamic networking environments. In such environments, a preferred manner in which to communicate potentially changes as the set of available media changes, the quality of service on particular media changes, and/or the workload on various communication media changes. Turning to FIG. 2, a simple example of a wireless computing environment is depicted wherein the invention is potentially exploited. In the illustrative environment, a notebook computer 200 includes multiple network interface cards (not specifically shown) facilitating communications over multiple communications media. In the particular example depicted in FIG. 2, the notebook computer 200 communicates with a cellular transmission tower 202 (via WWAN media) and a wireless transceiver 204 (via WLAN media) that is communicatively coupled to a local area network 206.

The wireless transceiver 204 (also referred to as a wireless access point, or WAP), provides access to a variety of resources on the LAN 206. For example, the wireless transceiver 204 provides access by the notebook computer 200 to directories/files maintained on a file server 208. The LAN 206 also contains a gateway/firewall/modem 210 providing access by users of the LAN 206, including the user of the notebook computer 200, to the Internet 212. The gateway/firewall/modem 210 also provides access by users of the Internet 212 to the resources on the LAN 206.

The user of the notebook computer 200, as a result of the multiple supported network media, is able to access the Internet 212 and the file server 208 (through the Internet 212) via multiple communication media. For example, utilizing a WWAN network interface, the notebook computer 200 is able to access a WWAN 213 the Internet 212 via a cellular network including the cellular transmission tower 202. Alternatively, the notebook computer 200 accesses resources on the LAN 206 via the wireless transceiver 204. The LAN 206 in the illustrative example is assumed to include network access and proxy servers that enable a properly authenticated user of the notebook computer 200 to access resources of the Internet 212 and the LAN 206 via either of the two illustratively depicted wireless network media. The capability of the notebook computer to access a same resource via multiple media introduces the potential for selection of a particular one of the wireless network media based upon current conditions, needs, preferences, etc. of the user of the notebook computer 200. For example, other users of the network (e.g., PC 214 connected via wireless transceiver 204 and hardwired PCs 216) compete for limited network bandwidth and/or degrade quality of communications via a particular one of multiple network media. Furthermore, the PC 214, due to its use of wireless user interface devices (a mouse and keyboard), may create signal interference that degrades other wireless communications. In such instances, a relatively static preference list may not select the best connection available for meeting the particular needs of the notebook 200's current user under the current networking environment conditions.

A roaming (network and interface selection) engine, incorporated within the notebook computer 200 embodying the present invention, applies criteria to information pertaining to multiple supported network media interfaces to select one or more of the notebook computer 200's set of network interfaces and associated networks to carry out current networking needs of the notebook computer 200. The roaming engine supports automated network and interface selection decision-making for each of its multiple network interfaces based upon status/capabilities information supplied by multiple network interfaces. The roaming engine is capable of taking into account information relating to the current status/capabilities of other network/media combinations when selecting a currently preferred network and interface combination with which to establish a connection. In addition to a preference list, the roaming engine can base its network interface/network selection decisions upon: availability of particular resources, network speed (maximum/actual), day/time as well as any other desired factor that can be obtained by the roaming engine. Thus, the scope of information and breadth of factors (each encompassing potentially multiple media) that determine the notebook computer 200's multiple network interface configuration is significantly enhanced in comparison to preference lists that merely descend a list of network interfaces for a single medium (e.g., WLAN), ordered by preference, until an available network interface for establishing a desired connection is identified.

Figure 3:
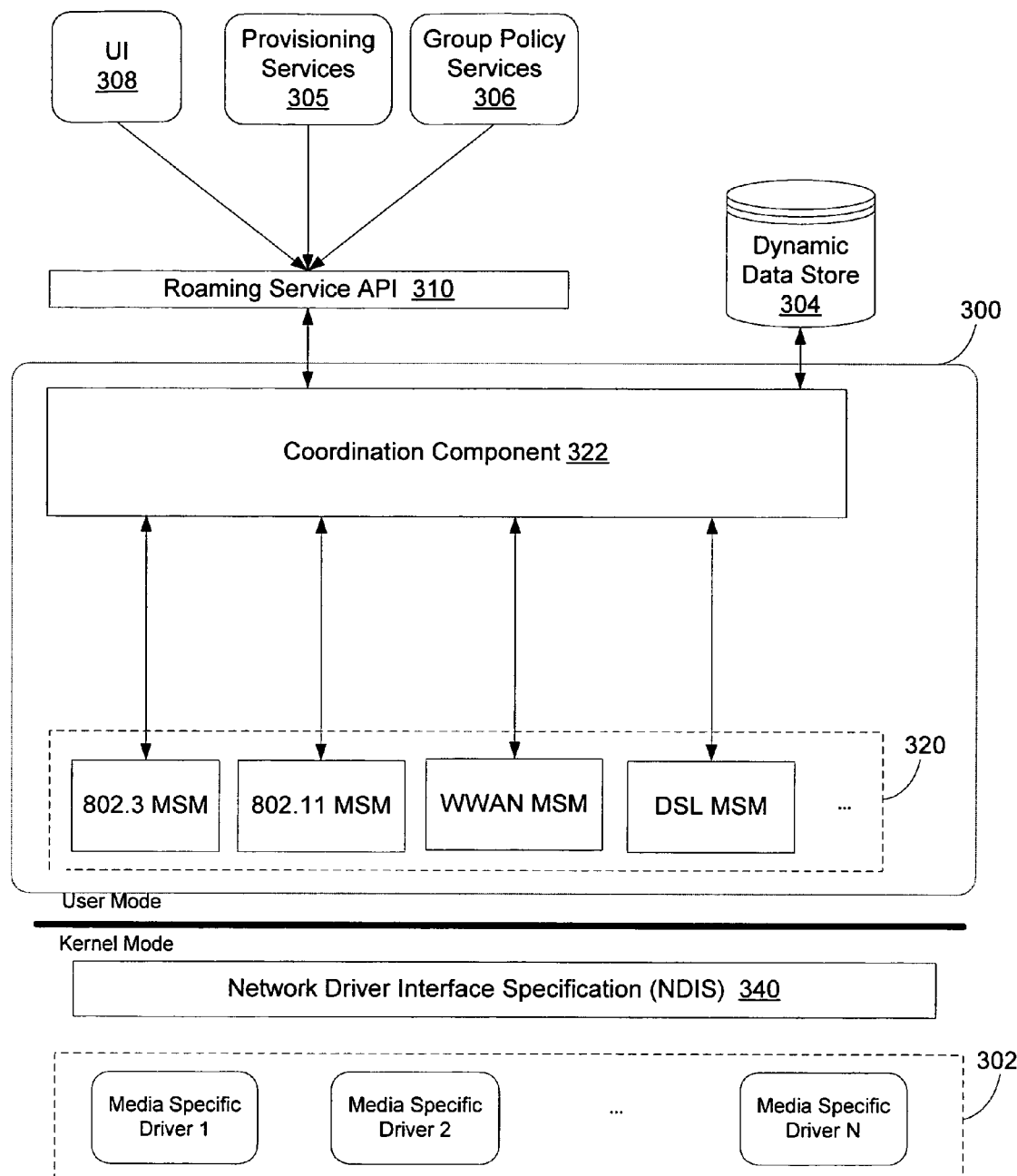
FIG. 3 is a schematic diagram identifying primary components in a mobile connectivity module to WWAN device driver interface within a computing device embodying the present invention.

Having described an exemplary wireless networking environment wherein the present invention is preferably incorporated, attention is directed to FIG. 3 wherein an exemplary network software architecture/framework is schematically depicted for incorporation into the notebook computer 200 (or any other computing device). The network software architecture is characterized by centralized coordination control that is incorporated into a user-mode connectivity service entity, such as Roaming Services 300.

Beginning at the physical network interface level, in the illustrative architecture, a set of N media specific drivers 302 of various media types (e.g., Bluetooth, WWAN, WLAN—e.g., 802.11a/b/g, etc.) are associated with a set of N currently present network interface cards (NICs) installed on the computer 200. In the illustrative example, each of the media specific drivers 302 communicates with a corresponding NIC. Such communications include, among other things, status/capabilities information provided by the NICs. Such status/capabilities information is obtained, for example, by periodic scanning performed by the NICs upon request by the drivers 302. Upon request, status/capabilities information gathered by the N media specific drivers 302 is passed to and stored within a dynamic data store 304. In addition to receiving scanning commands for searching frequency bands for available wireless devices and networks, the NICs also receive configuration commands from the drivers 302.

It is noted that, in an embodiment of the invention, the aforementioned network interface status/capabilities information and notifications are accessible by applications, provisioning services 305 (e.g., a wireless ISP), group-policy services 306, and a user interface 308 via a common Roaming Services API 310. By way of example, the common Roaming Services API 310 includes callable methods/operations/functions for querying and changing, via the user interface 308 or group policy services 306: preference lists, visible lists, media configurations, device states, user authentication data, and network configuration.

In an embodiment of the invention, a set of media specific modules 320 support automatic network and interface selection and network communication relating to particular media types. In the illustrative example, the set of media specific modules 320 include: an 802.3 module, an 802.11 module, a WWAN module, and a DSL module. The media specific modules 320 request capabilities/status information from and communicate with the media specific drivers on behalf of the Roaming Services entity 300 and invoke scanning of network interfaces by associated media specific drivers of a supported media type.

Network interface configuration commands are passed to an appropriate one (or ones) of the media specific modules 320 to connect to a particular network or networks. In response to configuration instructions received from the Roaming Services entity 300, the media specific modules 320 initiate changes to connections associated with identified network interfaces via calls to associated media specific drivers. In the exemplary embodiment, each one of the media specific modules 320 incorporates a state machine for carrying out the above-described functionality. While the illustrative embodiment provides a media specific module for a particular medium type or class of media types, it is contemplated that alternative embodiments of the invention include composite media specific modules that support multiple, unrelated media types (e.g., a WWAN/WLAN media specific module).

The media specific modules 320 are associated with two interfaces. The media specific modules 320 communicate with the Roaming Services entity via a generalized interface incorporated into a media specific coordination component 322. The coordination component 322, comprising a roaming engine and auto-configuration engine, coordinates external data and stores information as needed. The user-mode media specific modules 320 communicate with the media specific drivers 302, for example, according to (kernel mode) network driver interface specification (NDIS) 340. In an embodiment of the invention, the media specific modules 320 communicate with the media specific drivers 302 according to NDIS using Object Identifiers (OIDs).

In an embodiment of the invention, each of the media specific drivers 302 contains its own information base, in which the driver stores dynamic configuration information and statistical information that a management entity can query or set. An Ethernet multicast address list is an example of configuration information. The number of broadcast packets received is an example of statistical information. Each information element within the information base is referred to as an object, and is referred to via an OID. Therefore, if a management entity wants to query or set a particular managed object, it provides the specific OID for that object.

Figure 4:
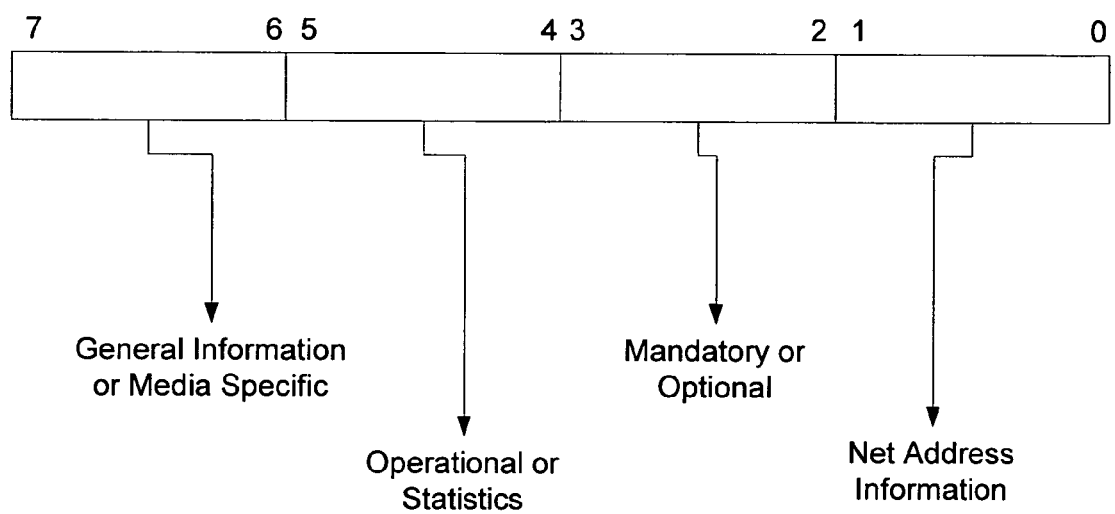
FIG. 4 is a diagram illustrating components of an object identifier, in accordance with an embodiment of the invention.

The structure of an OID, in accordance with an embodiment of the invention, is shown in FIG. 4. The first 3 bytes of the OID provide a key to the OID's various classifications. The fourth byte identifies the specific information management object within those classifications.

As noted previously, in an embodiment of the invention, the user-mode connectivity service, such as the Roaming Service, is linked to the WWAN driver via an interface. In a preferred embodiment of the invention, communications along this interface are in accordance with NDIS. For command and control operations, the Roaming Service and WWAN driver communicate by exchanging OIDs. Three primitives (SET, QUERY, INDICATE) are available, depending on who initiates the action and where the control data is flowing. A SET is called by the Roaming Service and sends a data structure down to the WWAN driver. A QUERY is also called by the Roaming Service, but causes the WWAN driver to send a data structure up to the Roaming Service. An INDICATE is called by the WWAN driver, enabling it to proactively send a data structure up to the Roaming Service. In each case, an Object Identifier (OID) is passed along with the structure, allowing the recipient to cast the structure accordingly.

In an embodiment of the invention, the WWAN driver implements the MiniportSetInformation NDIS handler to respond to SET requests as follows in Table 1.

TABLE 1

```
NDIS_STATUS MiniportSetInformation(
    IN NDIS_HANDLE    MiniportAdapterContext,
    IN NDIS_OID       Oid,
    IN PVOID          InformationBuffer,
    IN ULONG          InformationBufferLength,
    OUT PULONG        BytesRead,
    OUT PULONG        BytesNeeded
    );
```

In accordance with this implementation, MiniportAdapterContext specifies the handle to a miniport driver-allocated context area in which the driver maintains per-NIC state, set up by MiniportInitialize. The OID parameter specifies the system-defined OID_XXX code designating the SET operation the driver should carry out. The InformationBuffer is a pointer to a buffer containing the OID-specific data used by MiniportSetInformation for the set. InformationBufferLength specifies the number of bytes at InformationBuffer. BytesRead is a pointer to a variable that MiniportSetInformation sets to the number of bytes it read from the buffer at InformationBuffer. BytesNeeded is a pointer to a variable that MiniportSetInformation sets to the total number of bytes it needs to satisfy the request if InformationBufferLength is less than OID requires.

In an embodiment of the invention, the WWAN Driver implements the MiniportQueryInformation NDIS handler to respond to a QUERY requests as follows in Table 2.

TABLE 2

```
MiniportQueryInformation(
    IN NDIS_HANDLE    MiniportAdapterContext,
    IN NDIS_OID       Oid,
    IN PVOID          InformationBuffer,
    IN ULONG          InformationBufferLength,
    OUT PULONG        BytesWritten,
    OUT PULONG        BytesNeeded
    );
```

In accordance with this implementation, MiniportAdapterContext specifies the handle to a miniport driver-allocated context area in which the driver maintains per-NIC state, set up by MiniportInitialize. The OID parameter specifies the system-defined OID_XXX code designating the global query operation the driver should carry out. The InformationBuffer is a pointer to a buffer in which MiniportQueryInformation should return the OID-specific information. InformationBufferLength specifies the number of bytes at InformationBuffer. BytesWritten is a pointer to a variable that MiniportQueryInformation sets to the number of bytes it is returning at InformationBuffer. BytesNeeded is a pointer to a variable that MiniportQueryInformation sets to the total number of bytes it needs to satisfy the request if InformationBufferLength is less than OID requires.

In an embodiment of the invention, Indications are sent by calling NdisMIndicateStatus as follows in Table 3.

TABLE 3

```
NdisMIndicateStatus(
    IN NDIS_HANDLE    MiniportAdapterHandle,
    IN NDIS_STATUS    GeneralStatus,
    IN PVOID          StatusBuffer,
    IN UINT           StatusBufferSize    );
```

In accordance with this implementation, the GeneralStatus parameter is set to NDIS_STATUS_WW_INDICATION for unsolicited indications. For asynchronous responses, it is set to NDIS_STATUS_WW_ASYNC_RESPONSE. For unsolicited communications, the StatusBuffer parameter contains data packaged in the data structure shown in Table 4. StatusBufferSize contains the total size of StatusBuffer.

TABLE 4

```
typedef struct _WWAN_ASYNC_NOTIFY {
    ULONG StatusType;    /* Notification code */
    ULONG DataSize;      /* Size of the OID data in bytes */
    ULONG DataOffset;    /* Offset of the OID data in bytes */
} WWAN_ASYNC_NOTIFY;
```

Figure 5:
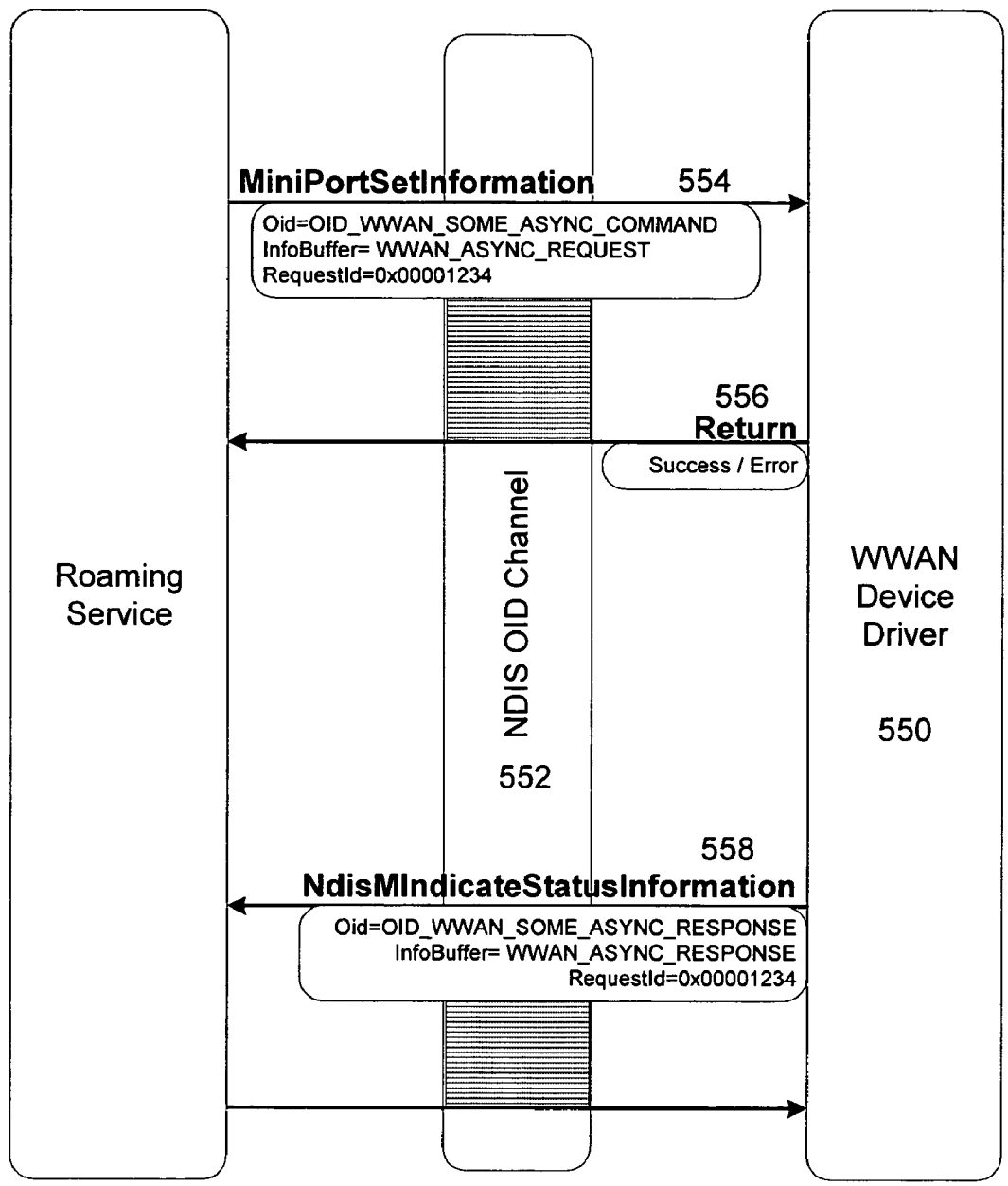
FIG. 5 is a modified flow diagram exemplifying an asynchronous request and response in a mobile connectivity module to WWAN device driver interface using object identifiers, in accordance with an embodiment of the invention.

Semantics for asynchronous operations are now described with reference to FIG. 5. In an embodiment of the invention, the SET and QUERY commands are used as defined for operations that return quickly. When the WWAN driver 550 receives such a command, it processes the request and returns a completion response in a timely fashion. However, some WWAN operations (e.g. scanning for visible operators or reading entries from a Subscriber Identity Modue, or SIM) could take multiple seconds to complete. Typically, NDIS 552 serializes OID commands (even if NdisMSetInformationComplete or NdisMQueryInformationComplete is used). Thus, in accordance with an embodiment of the invention, most operations interacting with the WWAN device use the following asynchronous mechanism based on SET/INDICATE semantics.

On a SET 554, InformationBuffer and InformationBufferLength point to the data structure shown in Table 6.

TABLE 6

```
typedef struct __WWAN__ASYNC__REQUEST {
    ULONG__PTR RequestId;   /* Used to match the async response */
    ULONG DataSize;         /* Size and offset of data structure*/
    ULONG DataOffset;       /* associated with this operation */
} WWAN__ASYNC__REQUEST;
```

If there is an immediate error condition, the WWAN driver fails the SET command immediately. Otherwise, WWAN driver returns success immediately and then begins carrying out the operation. The return values allowed in a return operation 556 are shown in Table 7.

TABLE 7

```
#define NDIS__STATUS__SUCCESS                <val>
#define NDIS__STATUS__WW__UNKNOWN__VERSION   <val>
#define NDIS__STATUS__WW__INVALID__CAPABILITIES <val>
```

Until the return operation 556, the NDIS OID channel 504 is blocked for other OIDs. After the return operation 556, the NDIS OID channel 504 is open for other OIDs, which could include more asynchronous requests. The WWAN device driver keeps track of pending asynchronous requests via the requests' RequestID parameters, which are stored in the information base of the WWAN device driver 550. When the WWAN device driver 550 completes the requested operation, the WWAN driver 550 sends an INDICATE 558 of OID type OID_WW_ASYNC_RESPONSE with ObjectDataSize and ObjectDataOffset pointing the structure shown in Table 8, matching the RequestID parameter from the original asynchronous SET request 554.

TABLE 8

```
typedef struct __WWAN__ASYNC__RESPONSE {
    ULONG__PTR RequestId;            /* Used to match the async response */
    WWAN__RESULT__CODE ResultCode;   /* Result of the command */
    ULONG DataSize;                  /* Size and offset of data structure */
    ULONG DataOffset;                /* associated with this operation */
} WWAN__ASYNC__RESPONSE;
```

The RequestId parameter matches whatever value was passed in on the SET 554. In an embodiment of the invention, the ResultCode of the response is one of the values shown in Table 9.

TABLE 9

```
typedef enum __WWAN__RESULT__CODE {
    WwanResultSuccess,              /* Succeeded                          */
    WwanResultSuccessPartial,       /* Succeeded, partial results
                                       given                              */
    WwanResultFailure,              /* Failed, no reason given            */
    WwanResultNoSim,                /* Failed, SIM is not present         */
    WwanResultBadSim,               /* Failed, SIM is invalid             */
    WwanResultSimRejected,          /* Failed, SIM was rejected           */
    WwanResultNotInitialized,       /* Failed, device not ready           */
    WwanResultSubsidyLocked,        /* Failed, Device is subsidy
                                       locked                             */
    WwanResultPinLocked,            /* Failed, operation requires
                                       PIN                                */
    WwanResultPukLocked,            /* Failed, operation requires
                                       PUK                                */
    WwanResultPin2Locked,           /* Failed, operation requires
                                       PIN2                               */
    WwanResultPuk2Locked,           /* Failed, operation requires
                                       PUK2                               */
    WwanResultNetworkPwdLocked,     /* Failed, requires network
                                       pwd                                */
    WwanResultDevicePwdLocked,      /* Failed, requires device pwd        */
    WwanResultWrongPassword,        /* Failed, password/PIN is
                                       incorrect                          */
    WwanResultPasswordIgnored,      /* Failed, password type is
                                       unlocked                           */
    WwanResultRegistrationDenied,   /* Failed, emergency calls okay       */
    WwanResultNoProvidersFound,     /* Failed, still searching            */
    WwanResultNoActiveProvider,     /* Failed, must be registered         */
    WwanResultNotAttached,          /* Failed, must be packet
                                       attached                           */
    WwanResultMaxActivatedContexts, /* Failed, max active
                                       contexts                           */
    WwanResultServiceUnavailable,   /* Failed, e.g. no packet
                                       roaming                            */
    WwanResultMax                   /* Maximum value                      */
} WWAN__RESULT__CODE;
```

Figure 6:
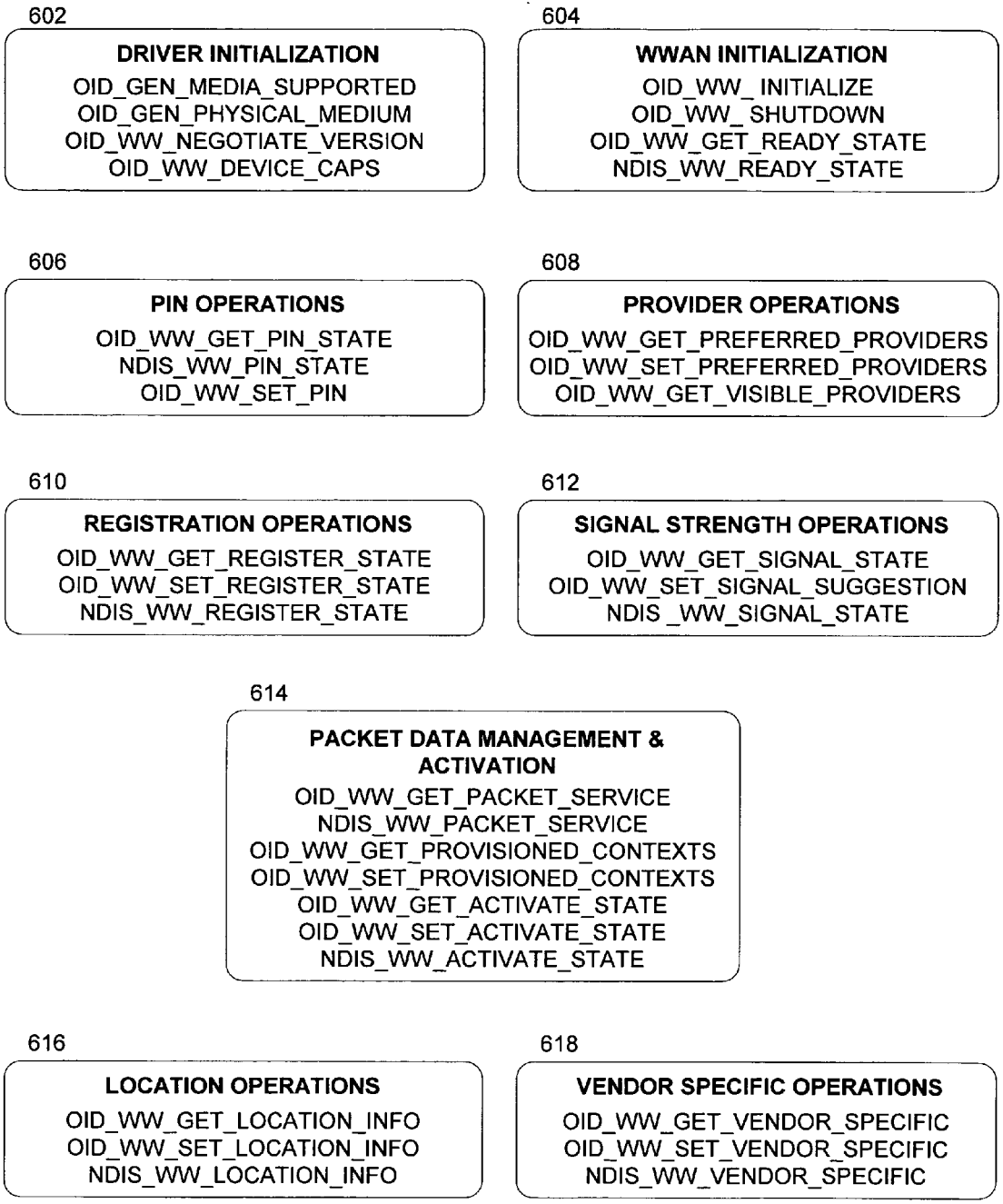
FIG. 6 is a diagram illustrating functional sets of object identifiers, as used in an embodiment of the invention.

The OIDs and status indications defined for WWAN drivers, as used in an embodiment of the invention, are now described with reference to FIG. 6. These OIDs are in addition to other mandatory OIDs and indications required to be supported by any NDIS Miniport driver. Some OIDs and status indications are required based on the type of technology used. Indication values given are only for the NDIS_STATUS_WW_INDICATION status type.

In an embodiment of the invention, several OIDs support driver initialization 602. Descriptions of the OIDs used to support driver initialization are as follows:

OID_GEN_MEDIA_SUPPORTED. When queried, the miniport must return NdisMedium802_3. This means that the WWAN driver will need to spoof a DHCP server and ARP resolutions.

OID_GEN_PHYSICAL_MEDIUM. When queried, the miniport must return NdisPhysicalMediumWirelessWan. The Roaming Service is required to obtain this value before performing any WWAN OID actions.

OID_WW_NEGOTIATE_VERSION. This object is used to negotiate the version of the interface between Roaming Service and the WWAN driver. First, the Roaming Service does a SET, telling the WWAN driver which versions it supports. Then the Roaming Service performs a QUERY, and the versions supported by the WWAN driver are returned, along with a negotiated version. The Roaming Service is required to negotiate the version with the WWAN driver before performing further WWAN OID actions. A data structure used to support the OID_WW_NEGOTIATE_VERSION object is shown in Table 10. If a SET is performed before the QUERY, and the WWAN driver has found a good version to use, the NegotiatedVersion parameter returned by the QUERY is set to the version to be used. If SET was not performed or a common version was not found, the NegotiatedVersion parameter is set to 0xffffffff, an error is generated for this an all subsequent SET and QUERY operations, and the driver does not issue any INDICATEs.

TABLE 10

```
typedef ULONG WWAN_VERSION;   /* A value specifies the version.
                                 bit [16:31] : Major version
                                 bit [0:15] : Minor version
*/
typedef struct _WWAN_CFG_VERSION_RANGE {
    WWAN_VERSION LowVersion;
    WWAN_VERSION HighVersion;
    WWAN_VERSION NegotiatedVersion;
} WWAN_VERSION_RANGE;
```

OID_WW_DEVICE_CAPS. This object is used to read the capabilities of the WWAN driver, including the cellular technology, the classes of packet data supported, the type of voice service provided, and whether a SIM is used. The first and last are particularly important, given that provider selection and SIM user interfaces depend on these two capability values. The manufacturer and firmware revision are also available as optional fields. Data structures supporting the OID_WW_DEVICE_CAPS object, in accordance with an embodiment of the invention, are shown in Table 11. The WwanDeviceType parameter indicates whether the device is local or remote with respect to the Roaming Service device. The WwanCellularClass parameter controls cellular technology specific features, such as provider registration modes. When set to WwanCellularClassGsm, manual and automatic modes are allowed. When set to WwanCellularClassCdma, only automatic mode is allowed. The WwanVoiceClass parameter denotes the presence of voice service, and how such service interacts with data service. The WwanSimClass parameter controls whether the Roaming Service should perform SIM specific operations. The WwanDataClass bit field parameter indicates which data services are supported. The Manufacturer field points to the manufacturer string. The Model field points to the model string. The Firmware field points to the firmware revision string. The DevSpecificSize and DevSpecificOffset fields point to device specific interface information.

TABLE 11

```
typedef enum _WWAN_DEVICE_TYPE
{
    WwanInterfaceTypeUnknown,
    WwanInterfaceTypeLocal,
    WwanInterfaceTypeRemote,
    WwanInterfaceTypeMax
}
WWAN_DEVICE_TYPE;
typedef enum WWAN_CELLULAR_CLASS {
    WwanCellularClassUnknown,
    WwanCellularClassGsm,
    WwanCellularClassCdma,
    WwanCellularClassMax
} WWAN_CELLULAR_CLASS;
#define WWAN_DATA_CLASS_UNKNOWN    0x00000000
#define WWAN_DATA_CLASS_GPRS       0x00000001
#define WWAN_DATA_CLASS_EGPRS      0x00000002
#define WWAN_DATA_CLASS_UMTS       0x00000004
#define WWAN_DATA_CLASS_HSDPA      0x00000008
#define WWAN_DATA_CLASS_1XRTT      0x00000010
#define WWAN_DATA_CLASS_1XEVDO     0x00000020
#define WWAN_DATA_CLASS_1XEVDV     0x00000040
#define WWAN_DATA_CLASS_3XRTT      0x00000080
typedef enum WWAN_VOICE_CLASS {
    WwanVoiceClassUnknown,
    WwanVoiceClassNoVoice,
    WwanVoiceClassSeparateVoiceData,
    WwanVoiceClassSimultaneousVoiceData,
    WwanVoiceClassMax
} WWAN_VOICE_CLASS;
typedef enum WWAN_SIM_CLASS {
    WwanSimClassUnknown,
    WwanSimClassNoSim,
    WwanSimClassSimSupported,
    WwanSimClassMax
} WWAN_SIM_CLASS;
#define WWAN_MANUFACTURER_LEN      32
#define WWAN_MODEL_LEN             32
#define WWAN_FIRMWARE_LEN          32
typedef struct _WWAN_DEVICE_CAPS {
    WWAN_DEVICE_TYPE WwanDeviceType;          /* local or remote device        */
    WWAN_CELLULAR_CLASS WwanCellularClass;    /* GSM, CDMA, etc                */
    WWAN_VOICE_CLASS WwanVoiceClass;          /* Voice service capabilities    */
```

TABLE 11-continued

| | | | |
|---|---|---|---|
| WWAN_SIM_CLASS | WwanSimClass; | /* SIM required? | */ |
| ULONG | WwanDataClass; | /* Technology of data service | */ |
| WCHAR | Manufacturer [WWAN_MANUFACTURER_LEN]; | | |
| WCHAR | Model [WWAN_MODEL_LEN]; | | |
| WCHAR | Firmware [WWAN_FIRMWARE_LEN]); | | |
| ULONG | DevSpecificSize; | /* Size & offset of device | */ |
| ULONG | DevSpecificOffset; | /* OPTIONAL WWAN info | */ |
| } WWAN_DEVICE_CAPS; | | | |

In an embodiment of the invention, several OIDs support WWAN initialization 604. Descriptions of the OIDs used to support WWAN initialization are as follows:

OID_WW_INITIALIZE. A SET on this object indicates that the Roaming Service is ready for the WWAN initialization procedure. If a SIM is used, it is also initialized at this time. No data structure is passed down. The device can begin initialization prior to receiving this command; however, OID_ WW_READY_STATE indications may only be sent after the driver receives this initialization OID. If the PIN is enabled, the driver indicates a PIN is needed using the WWAN_NOTIFY_PIN_STATE indication. Once the driver is ready for network registration, it indicates WWAN_READYSTATE_INITIALIZED. The transceiver is not be powered on at this time, in case the system is in airplane mode. If the WWAN driver receives the OID_WW_INITIALIZE OID and is already initialized, the Roaming Service has likely terminated unexpectedly and was restarted. The driver thus completes any pending requests with a WwanResultFailure error, and tears down any existing interfaces and connections, and returns to a proper initialization state.

OID_WW_SHUTDOWN. A SET on this object indicates that the Roaming Service is about to deactivate the driver. No data structure is required. Clean-up procedure begins, such as deactivating any contexts, detaching and deregistering. The driver can send associated indications as these operations occur, but the Roaming Service only looks for the WWAN_READY_STATE_SHUTDOWN notification to know when WAN shutdown has completed. The Roaming Service can assume that WAN shutdown has completed after a certain timeout has elapsed. The Roaming Service waits for a certain period of time to allow for completion of asynchronous events. After that, it continues with remaining shutdown procedures.

OID_WW_GET_READY_STATE and NDIS_WW_READY_STATE. These objects allow the driver to let the Roaming Service know when certain pieces of functionality are ready at start-up and shutdown. (A change could happen during the course of operation, but it is unlikely.) Primarily, this allows the driver to put the WWAN device in the appropriate state before the Roaming Service activates the transceiver and registers on a network. Other states are also supported, such as when the SIM phonebook and SMS store are initialized. During initialization, the Roaming Service will not proceed to registration until it receives a WWAN_READY_STATE_INITIALIZED indication.

A data structure supporting these OIDs, in accordance with an embodiment of the invention, is shown in Table 12. The State parameter is a bit field of WWAN_READY_STATE_* constants. The Imsi parameter points to the IMSI string identifying the subscriber. This value need not be populated until the WWAN_READY_STATE_INITIALIZED state is reached. The Imei parameter points to the string identifying the equipment (IMEI in GSM and ESN in CDMA). This value need not be populated until the WWAN_READY_STATE_INITIALIZED state is reached. The IsdnCount, IsdnListSize, and IsdnListOffset parameters point to an array of MSISDN strings identifying the phone number(s) of the subscriber. Each is NULL terminated, and the final phone number is double NULL terminated. These values need not be populated until the WWAN_READY_STATE_INITIALIZED state is reached.

TABLE 12

| | | | |
|---|---|---|---|
| #define WWAN_READY_STATE_SHUTDOWN | 0x00000001 | /* stack is off | */ |
| #define WWAN_READY_STATE_PHONEBOOK | 0x00000002 | /* can read PB | */ |
| #define WWAN_READY_STATE_SMSSTORE | 0x00000004 | /* can read SMSs | */ |
| #define WWAN_READY_STATE_INITIALIZED | 0x00000008 | /* ready to power | */ |
| | | /* tx/rx and register | */ |
| #define WWAN_READY_STATE_NO_SIM | 0x00000010 | /* SIM not inserted | */ |
| #define WWAN_READY_STATE_BAD_SIM | 0x00000020 | /* SIM is invalid | */ |
| #define WWAN_READY_STATE_FAILURE | 0x00000040 | /* device failure | */ |
| #define WWAN_IMSI_LEN 32 | | | |
| #define WWAN_IMEI_LEN 32 | | | |
| typedef struct _WWAN_READY_STATE { | | | |
| ULONG State; | /* A WWAN_READY_STATE_* constants | | */ |
| WCHAR Imsi[WWAN_IMSI_LEN]; | /* Subscriber identity | | */ |
| WCHAR Imei[WWAN_IMSI_LEN]; | /* Equipment identity | | */ |
| ULONG IsdnCount; | /* Number of ISDNs listed | | */ |
| ULONG IsdnListSize; | /* Size of the ISDN string array | | */ |
| ULONG IsdnListOffset; | /* Offset to array of Null-terminated | | */ |
| | /* string ISDNs (phone numbers). | | */ |
| } WWAN_READY_STATE; | | | |

In an embodiment of the invention, several OIDs support PIN operations 606. Data structures supporting the PIN operation OIDs, in accordance with an embodiment of the invention, are shown in Table 13. The OIDs supporting PIN operations 606 are described as follows:

OID_WW_GET_PIN_STATE and NDIS_WW_PIN_STATE. These objects allow the driver to indicate different password conditions at start-up and during the course of operation, such as needing PIN, PIN2, PUK, and PUK2. Non SIM passwords are also supported. During initialization, the Roaming Service will not proceed to registration until it receives a WwanPinStateNone indication. A SET on OID_WW_ GET_PIN_STATE is used to query the current ready state asynchronously. DataSize and DataOffset in the WWAN_ASYNC_REQUEST structure are ignored. DataSize and DataOffset in the WWAN_ASYNC_REQUEST structure point to a WWAN_PIN_STATE structure. An INDICATE on NDIS_WW_PIN_STATE is sent when a ready state value changes. DataSize and DataOffset in the WWAN_ASYNC_ NOTIFY structure point to a WWAN_PIN_STATE structure. In one embodiment of the invention, the WWAN driver is responsible for handling emergency voice calls if WwanPinTypePin is indicated during startup. The transceiver is activated, automatic registration is performed, and the emergency call is initiated only after a user actually dials an emergency call from the PIN dialog.

WwanPinActionCancel. The WWAN driver then returns the appropriate password error for any outstanding commands that were waiting for a valid PIN to be entered.

With respect to the data structures used to support the PIN operations 606 shown in Table 13, the PinType parameter is a WWAN_PIN_TYPE value. The PinFormat Parameter indicates what format of characters is allowed for the pin. The PinLengthMin and PinLengthMax parameters are the minimum and maximum number of characters that must be entered for the PIN. They are set to −1 if range is unknown. If WWAN_PIN_TYPE indicates anything other than WwanPinTypeNone then the device is awaiting a PIN and the AttemptsRemaining parameter indicates how many tries are remaining for that PIN type. A -1 value indicates unknown. The PinAction parameter is a WWAN_PIN_ACTION value. The Pin parameter is the PIN to send down, or the PIN that is required to enable/disable PIN settings. When sending a PIN code or enabling/disabling the PIN, the NewPin fields should be ignored. When sending a PUK code, the Pin parameter points to the PUK code and NewPin points to the new PIN to set.

TABLE 13

```
typedef enum __WWAN__PIN__TYPE {
    WwanPinTypeUnknown,             /* awaiting an unknown pin type  */
    WwanPinTypeNone,                /* No pin is needed              */
    WwanPinTypeSubsidyLock,         /* Subsidy unlock code           */
    WwanPinTypePin,                 /* awaiting PIN entry            */
    WwanPinTypePuk,                 /* awaiting PUK entry            */
    WwanPinTypePin2,                /* awaiting PIN2 entry           */
    WwanPinTypePuk2,                /* awaiting PUK2 entry           */
    WwanPinTypeNetworkPassword,     /* awaiting network password     */
    WwanPinTypeDevicePassword,      /* awaiting PUK2 entry           */
    WwanPinTypeMax
} WWAN__PIN__TYPE;
typedef enum __WWAN__PIN__FORMAT {
    WwanPinFormatUnknown,           /* format of needed pin is unknown */
    WwanPinFormatNumeric,           /* allow characters 0-9,*,#        */
    WwanPinFormatAlphaNumeric,      /* allow characters a-z, A-Z, 0-9,*,# */
    WwanPinFormatMax
} WWAN__PIN__FORMAT;
typedef struct __WWAN__PIN__STATE {
    WWAN__PIN__TYPE PinType;        /* A WWAN__PIN__TYPE value         */
    WWAN__PIN__FORMAT PinFormat;    /* Numeric, alphanumeric, etc.     */
    ULONG PinLengthMin;             /* Minimum number of characters    */
    ULONG PinLengthMax;             /* Maximum number of characters    */
    ULONG AttemptsRemaining;        /* # of attempts remaining         */
} WWAN__PIN__STATE;
typedef enum __WWAN__PIN__ACTION {
    WwanPinActionUnknown,
    WwanPinActionSend,
    WwanPinActionEnable,
    WwanPinActionDisable,
    WwanPinActionChange,
    WwanPinActionCancel,            /* Do not send pin, just fail the cmd */
    WwanPinActionMax
} WWAN__PIN__ACTION;
#define WWAN__PIN__LEN              32
typedef struct __WWAN__SET__PIN {
    WWAN__PIN__ACTION PinAction;    /* A WWAN__PIN__ACTION value       */
    WWAN__PIN__TYPE   PinType;      /* A WWAN__PIN__TYPE value         */
    WCHAR             Pin[WWAN__PIN__LEN]; /* The PIN code itself      */
    WCHAR             NewPin[WWAN__PIN__LEN]; /* The new PIN code      */
} WWAN__SET__PIN;
```

OID_WW_SET_PIN. A SET on this object is used to send a PIN to the device, enable/disable PIN settings, or change a PIN on the SIM. If in response to an indication that PIN is needed, either the Roaming Service is not able to display PIN entry UI or the user cancels out of the dialog, then the Roaming Service sends the OID_WW_SET_PIN OID setting In an embodiment of the invention, several OIDs support provider operations 608:

OID_WW_GET_PREFERRED_PROVIDERS and OID_WW_SET_PREFERRED_PROVIDERS. These objects are used to read, add and delete entries from the preferred provider list stored locally on the device or SIM. The network is preferably not contacted to read in these fields. In one embodiment of the invention, if a forbidden provider list is also available, those entries are included in the list and tagged accordingly. A SET on OID_WW_GET_PREFERRED_PROVIDERS is used to asynchronously query the preferred provider list. A SET on OID_WW_SET_PREFERRED PROVIDERS is used to asynchronously set the preferred provider list. In an embodiment of the invention, the list is passed in its entirety. Individual additions and deletions are not tracked. The driver maintains a cached copy of the list and performs individual adds/deletes, or overwrites the entire list in a single operation.

OID_WW_GET_VISIBLE_PROVIDERS. This object is used to obtain the list of providers currently present in the device's range. A SET on this OID asynchronously queries the preferred provider list. DataSize and DataOffset in WWAN_ASYNC_RESPONSE point to a WWAN_PROVIDER_LIST structure. The scan operation preferably takes no more than 30 seconds. If this limit is reached, the driver returns a partial list.

Data structure supporting these provider operation OIDs 608, in accordance with an embodiment of the invention, are shown in Table 14.

In an embodiment of the invention, several OIDs support registration operations 610. Data structures supporting the registration operation OIDs 610, in accordance with an embodiment of the invention, are shown in Table 15. The OIDs supporting registration operations 610 are described as follows:

OID_WW_GET_REGISTER_STATE, OID_WW_SET_REGISTER_STATE and NDIS_WW_REGISTER_STATE. These objects enable powering on the transceiver and performing registration, along with associated state queries and indications. Automatic and manual registration modes are supported. The driver automatically initiates a packet attach once registration has succeeded. For networks that do not support an explicit packet attach, the driver still preferably indicates a packet attach state. As the registration state of the device changes, the driver sends appropriate indications so that the Roaming Service can reflect the correct state to the user. In an embodiment of the invention, the Roaming Service will only initiate registration once the driver indicates a state of WWAN_READY_STATE_INITIALIZED. The device remains in the registration mode until otherwise indicated or the driver is disabled. For WwanRegisterModeAutomatic, WwanRegisterModeManual and

TABLE 14

```
typedef enum _WWAN_PROVIDER_STATE {
    WwanProviderStateUnknown,       /* Unknown provider state            */
    WwanProviderStateForbidden,     /* Present, but on forbidden list    */
    WwanProviderStateAvailable,     /* Provider is available             */
    WwanProviderStatePreferred,     /* Available and on preferred list   */
    WwanProviderStateCurrent,       /* Currently registered operator     */
    WwanRegisterModeMax
} WWAN_PROVIDER_STATE;
#define WWAN_PROVIDERNAME_LEN    32
typedef struct _WWAN_PROVIDER {
    ULONG     ProviderId;                       /* Decimal encoded provider id   */
    WWAN_PROVIDER_STATE State;                  /* WWAN_PROVIDER_STATE value     */
    ULONG     ProviderName[WWAN_PROVIDERNAME_LEN];
} WWAN_PROVIDER;
typedef struct _WWAN_PROVIDER_LIST {
    ULONG     ProviderCount;        /* Number of providers in the array  */
    ULONG     ProviderListSize;     /* Size and offset to an array of    */
    ULONG     ProviderListOffset;   /* WWAN_PROVIDER entries             */
} WWAN_PROVIDER_LIST;
```

The ProviderID field is required. For GSM networks, this string is usually a concatenation of a 3-digit mobile country code (MCC) and a 2 or 3-digit mobile network code (MNC). It is recommended that the MNC code be pre-padded with zero's and set at three digits for alignment and parsing purposes. The State parameter represents various states that the provider entry could be tagged. The ProviderName parameter points to a friendly provider string. For UI reasons, the string preferably does not exceed 20 characters. This field is ignored when the Roaming Service sets the preferred provider list. The ProviderCount, ProviderListSize, and ProviderListOffset parameters form a list of WWAN_PROVIDER structures.

WwanRegisterModeReregister, the device automatically packet attaches once the device is camped on an operator. With WwanRegisterModeDeregister, the device automatically packet detaches. When setting the register mode, WwanRegisterModeAutomatic and WwanRegisterModeManual will not initiate a reregistration if the new mode is the same as the previous mode. WwanRegisterModeReregister is used for this purpose. This flag is only valid for setting registration state. Subsequent queries or indications on a registered device yield WwanRegisterModeAutomatic or WwnRegisterModeManual respectively.

TABLE 15

```
typedef enum _WWAN_REGISTER_MODE {
    WwanRegisterModeUnknown,            /* Register mode unknown              */
    WwanRegisterModeReregister,         /* Reregister using current mode      */
                                        /* and then packet attach             */
    WwanRegisterModeAutomatic,          /* Turn on transceiver, camp on best  */
                                        /* available network, packet attach   */
    WwanRegisterModeManual,             /* Turn on transceiver, use numeric   */
                                        /* code to camp, packet attach        */
```

TABLE 15-continued

```
    WwanRegisterModeDeregister,  /* Transceiver is on, but device is      */
                                 /* detached and deregistered            */
    WwanRegisterModeRadioOff,    /* Transceiver is off, device is        */
                                 /* detached and deregistered            */
    WwanRegisterModeMax
} WWAN_REGISTER_MODE;
typedef enum _WWAN_REGISTER_STATE {
    WwanRegisterStateUnknown,       /* Registration state unknown        */
    WwanRegisterStateDeregistered,  /* Not registered, not searching     */
    WwanRegisterStateSearching,     /* Searching for a provider          */
    WwanRegisterStateHome,          /* Device is on a home provider      */
    WwanRegisterStateRoaming,       /* Device is on roaming provider     */
    WwanRegisterStateDenied,        /* Registration denied, emergency    */
                                    /* may still be made                 */
    WwanRegisterStateMax
} WWAN_REGISTER_STATE;
typedef struct _WWAN_REGISTATION {
    WWAN_REGISTER_MODE   RegisterMode;   /* WWAN_REGISER_MODE value    */
    WWAN_REGISTER_STATE  RegisterState;  /* WWAN_REGISER_STATE value   */
    WWAN_PROVIDER        Provider;       /* WWAN_PROVIDER structure    */
} WWAN_REGISTRATION;
```

With respect to the data structures used to support the registration operations 610 shown in Table 15, the RegisterMode parameter describes the method that the WWAN device is using to find an operator to camp on. For WwanRegisterModeAutomatic and WwanRegisterModeManual, the device ensures the transceiver is activated, a provider is registered on, and automatically packet attach (if appropriate). For WwanRegisterModeDeregister, the device detaches and deregisters from the current network, but leaves the transmitter powered. For WwanRegisterModeRadioOff, the device detaches and deregisters from the current network, turns off the transmitter powered, but leaves the protocol stack (including SIM) initialized. The WwanRegisterModeReregister flag is only valid on a set when the device is currently in mode WwanRegisterModeAutomatic or WwanRegisterModeManual. The RegisterState parameter indicates the current registration state of the WWAN device, likely reflected in the user interface. When reading the registration state in automatic register mode, the Provider parameter contains the provider which the device is currently camped on (if applicable). When reading the registration state in manual register mode, the Provider parameter contains the provider which the device is locked to (even if the provider is unavailable). When setting the registration state in manual mode, it contains the operator ID to lock to (ignore operator string). When setting the registration state in automatic mode, this parameter is ignored.

In an embodiment of the invention, several OIDs support signal strength operations 612:

OID_WW_SET_SIGNAL_SUGGESTION, OID_WW_GET_SIGNAL_STATE and NDIS_WW_SIGNAL_STATE. These objects are used to manage signal strength state, reported as decibels above the driver's sensitivity noise floor. An indication is given when the signal strength changes outside of the default threshold value, ensuring the eventing rate does not exceed the default maximum frequency. Appropriate hysteresis is used. Applications preferably never poll for signal strength. In special situations (such as startup) an application uses QUERY to obtain the signal strength. A SET on the OID_WW_SET_SIGNAL_SUGGESTION object asynchronously sets the suggested notification intervals and thresholds for field strength. In some embodiments, these values are used by the driver during conditions where increased power savings can be realized by reducing signal notifications even further. An INDICATE on the NDIS_WW_SIGNAL_STATE object allows the driver to send a signal strength notification when a measured signal strength travels outside the threshold. By default, the driver reports an indication no more than every 5 seconds. The driver preferably only notifies if the signal strength changes at least ±4 db from the last reported value.

A data structure used to support the signal strength operation OIDs 612, in accordance with an embodiment of the invention, is shown in Table 16.

TABLE 16

```
typedef struct _WWAN_
SIGNAL_STATE {
    ULONG Rssi;           /* Decibels (db) above noise floor  */
    ULONG RssiInterval;   /* Suggested interval in seconds    */
    ULONG RssiThreshold;  /* Suggested +/- threshold in db    */
} WWAN_SIGNAL_STATE;
```

The Rssi parameter is the signal strength, reported as decibels above the device's sensitivity noise floor. To minimize power consumption, the interface specifies a default minimum interval for sending notifications based on Rssi changing. In some situations (e.g. during long periods of user inactivity), the RssiInterval specifies when a longer interval may be used to conserve additional power. It is not required that the driver adhere to this increased interval. When setting the interval, a "−1" value means no suggested value is available. A default minimum interval is used. When indicating signal strength, this value contains the interval currently used by the device. To minimize power consumption, the interface further specifies a default ± threshold for sending notifications based on Rssi changing. In an embodiment of the invention, when the signal strength changes by an amount exceeding the threshold, the driver notifies the Roaming Service of the change. In some situations (e.g. during areas of strong signal), the RssiThreshold specifies when a larger ± threshold may be used to conserve additional power. It is not required that the driver adhere to this increased threshold. When setting the interval, a "−1" value means no suggested value is available. A default threshold is used. When indicating signal strength, this value contains the threshold currently used by the device.

In an embodiment of the invention, several OIDs support packet data management and activation operations 614. Data structures supporting the packet data management and activation operations 614, in accordance with an embodiment of the invention, are shown in Table 17. The OIDs supporting packet data management and activation operations 614 are described as follows:

OID_WW_GET_PACKET_SERVICE and NDIS_WW_PACKET_SERVICE. These objects are used to read and notify the current packet attach state and associated data service(s) supported. Once registered, the device automatically attempts to packet attach, so no SET object is required.

OID_WW_GET_PROVISIONED_CONTEXTS and OID_WW_SET_PROVISIONED_CONTEXTS. These objects are used to read and write preferred context entries stored on the device. These settings are local to the device.

packet context and to query the associated state. The OID_WW_SET_ACTIVATE_STATE object is used to initiate or close a particular context. The WWAN driver only attempts context activation when the Roaming Service sends this OID. The driver does not automatically activate a context even after losing registration and/or signal. If the access string is not provided, a context is activated with a blank access string rather than a default string. The WWAN driver is expected to send the appropriate indications as the activation state changes, via the NDSI_WW_ACTIVATE_STATE object. This object will only be called if the WWAN driver indicates a register state of WwanRegisterStateHome or WwanRegisterStateRoaming. On GSM networks, the device must also indicate an attach state of WwanAttachStateAttached.

TABLE 17

```
typedef enum _WWAN_ATTACH_STATE {
    WwanAttachStateUnknown,
    WwanAttachStateDetached,              /* Device is likely unregistered     */
    WwanAttachStateSearching,             /* Automatic after register success  */
    WwanAttachStateAttached,              /* Packet attached                   */
    WwanAttachStateDenied,                /* Packet service unavailable        */
    WwanAttachStateMax
} WWAN_ATTACH_STATE;
typedef enum _WWAN_CONTEXT_AUTHENTICATION {
    WwanContextAuthenticationUnknown,
    WwanContextAuthenticationNone,        /* Ignore user/pwd fields            */
    WwanContextAuthenticationChap,        /* Use CHAP authentication           */
    WwanContextAuthenticationPap,         /* Use PAP authentication            */
    WwanContextAuthenticationEap,         /* Use EAP authentication            */
    WwanContextAuthenticationMax
} WWAN_CONTEXT_AUTHENTICATION;
typedef enum _WWAN_ACTIVATION_STATE {
    WwanActivationStateUnknown,
    WwanActivationStateActivated,
    WwanActivationStateDeactivated,
    WwanActivationStateMax
} WWAN_ACTIVATION_STATE;
#define WWAN_ACCESSSTRING_LEN      64
#define WWAN_USERNAME_LEN          32
#define WWAN_PASSWORD_LEN          32
typedef struct _WWAN_PACKET_SERVICE {
    WWAN_ATTACH_STATE   AttachState;   /* Ignored for CDMA devices    */
    ULONG               DataClass;     /* Available data service(s)   */
} WWAN_PACKET_SERVICE;
typedef struct _WWAN_CONTEXT {
    ULONG    ProviderId                          /* Provider owning the access str   */
    WWAN_ACTIVATION_STATE ActivationState;       /* Activation state                 */
    WCHAR AccessString[WWAN_ACCESSSTRING_LEN];
    WWAN_CONTEXT_AUTHENTICATION AuthenticationType;
                                                 /* Authentication type              */
    WCHAR    UserName[WWAN_USERNAME_LEN];
    WCHAR    Password[WWAN_PASSWORD_LEN];
} WWAN_CONTEXT;
typedef struct _WWAN_CONTEXT_LIST {
    ULONG ContextCount;
    ULONG ContextListSize;       /* Size of the Context list */
    ULONG ContextListOffset;     /* Offset to an array of WWAN_CONTEXT  */
} WWAN_CONTEXT_LIST;
```

The network is preferably not contacted to read in these fields. A SET on the OID_WW_GET_PROVISIONED_CONTEXTS object asynchronously queries the preferred providers. A SET on the OID_WW_SET_PROVISIONED_CONTEXTS object is used to asynchronously activate or deactivate the provided access string. The list is passed in its entirety. Individual additions and deletions are not tracked. In some embodiments, the driver maintains a cached copy of the list and performs individual additions/deletions, or overwrites the entire list in a single operation.

OID_WW_GET_ACTIVATE_STATE, OID_WW_SET_ACTIVATE_STATE and NDIS_WW_ACTIVATE_STATE. These objects are used to activate (or deactivate) a particular With respect to the data structures used to support the packet data management and activation operations 614, shown in Table 17, AttachState is the packet attach state. In GPRS, the Roaming Service must see WwanAttachStateAttached before it will proceed with activating a context. For technologies that do not support packet attach, this parameter is ignored. The DataClass parameter is a WWAN_DATA_CLASS_* constant indicating which data class is currently being used. If this changes (e.g. transition from 1xRTT to 1xEvDo), a notification is sent to indicate this change of service. The Provider parameter identifies the provider that owns the service referenced by the access string, which is used because some networks do not use a globally unique access string. (For example, "internet" is used by several providers.) The WWAN_CONTEXT_AUTHENTICATION field denotes the type of authentication that is used when user/password authentication is required. The Activation-State parameter instructs the driver what it should do with the provided context when setting the activation state. When querying activation state, the ActivationState parameter reflects the current activation state of the given context. In GSM networks, the AccessString parameter would be an APN string such as "internet2.voicestream.com". In CDMA networks, it might be a special dial code such as "#777". The AuthenticationType parameter denotes what authentication (if any) to use when activating the context. The UserName parameter points to a username used for authentication. The Password parameter points to a password used for authentication. The NumberOfContexts, ContextListSize, and ContextListOffset parameters are references an array of context structures. The Context parameter denotes the access string and optional authentication info needed to activate a packet connection.

In an embodiment of the invention, several OIDs support location operations 616:

OID_WW_GET_LOCATION_INFO, OID_WW_SET_LOCATION_INFO and NDIS_WW_LOCATION_INFO. These objects are used to read the cell tower information currently available. This is used to provide a better "fingerprint" of the immediate network topology.

In an embodiment of the invention, several OIDs support vendor specific operations 618. A data structure used to support these OIDS is shown in Table 18.

TABLE 18

```
typedef struct _WWAN_VENDOR_SPECIFIC {
    ULONG_   AppId;      /* 0 reserved for "ALL"        */
    PTR
    ULONG    DataSize;   /* Size of the vendor specific data  */
    ULONG    DataOffset; /* Offset to the vendor specific data */
} WWAN_VENDOR_SPECIFIC;
```

When the AppId parameter is non-zero, it uniquely identifies each application that registered to the Roaming Service. The WWAN driver broadcasts a message to all registered applications by issuing an INDICATE with AppId set to zero.

The OIDs supporting vendor specific operations 618 include: OID_WW_GET_VENDOR_SPECIFIC, OID_WW_SET_VENDOR_SPECIFIC and NDIS_WW_VENDOR_SPECIFIC. These objects are used to perform operations with vendor specific data, opaque to the Roaming Service. An application identifier is available to associate each command with a specific application. An indication with a blank application identifier will be broadcast to all registered applications.

Figure 7:
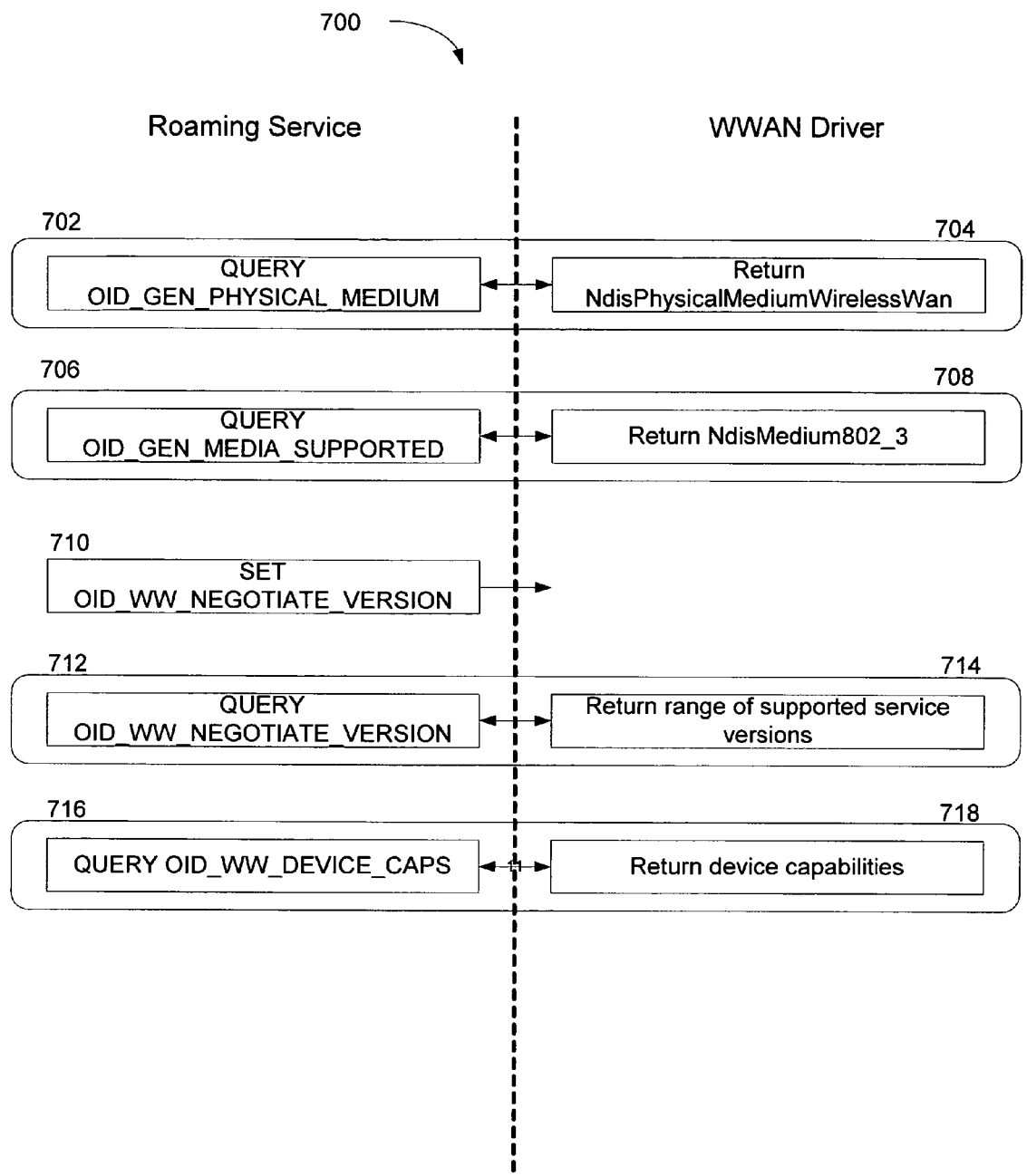
FIG. 7 is a modified flow diagram illustrating initialization of a WWAN device driver using object identifiers, in accordance with an embodiment of the invention.

Examples of various scenarios employing the above-described OIDs, in accordance with an embodiment of the invention, are now described. FIG. 7 illustrates an example 700 of initializing a WWAN device driver by using OIDs, in accordance with an embodiment of the invention. Generally, the driver identifies itself as a WWAN driver and performs the appropriate version negotiation. The Roaming Service queries the driver using OID_GEN_PHYSICAL_MEDIUM in step 702. The driver returns NdisPhysicalMediumWirelessWan in step 704, indicating that it supports the WWAN OIDs. The Romaing Service then queries the driver with OID_GEN_MEDIA_SUPPORTED in step 706, to which the driver responds with NdisMedium802_3 in step 708, thus communicating that Ethernet packets are formatted according to the 802.3 protocol. The Roaming Service then sets a range of configuration service versions supported by the Roaming Service with OID_WW_NEGOTIATE_VERSION in step 710. The Roaming Service queries the driver with OID_WW_NEGOTIATE_VERSION in step 712 to find the range of configuration service versions supported by the driver. The driver returns this value in step 714. The Roaming Service then queries the driver with OID_WW_DEVICE_CAPS to discover the capabilities of the device driver in step 716. The driver returns these capabilities in step 718.

Figure 8:
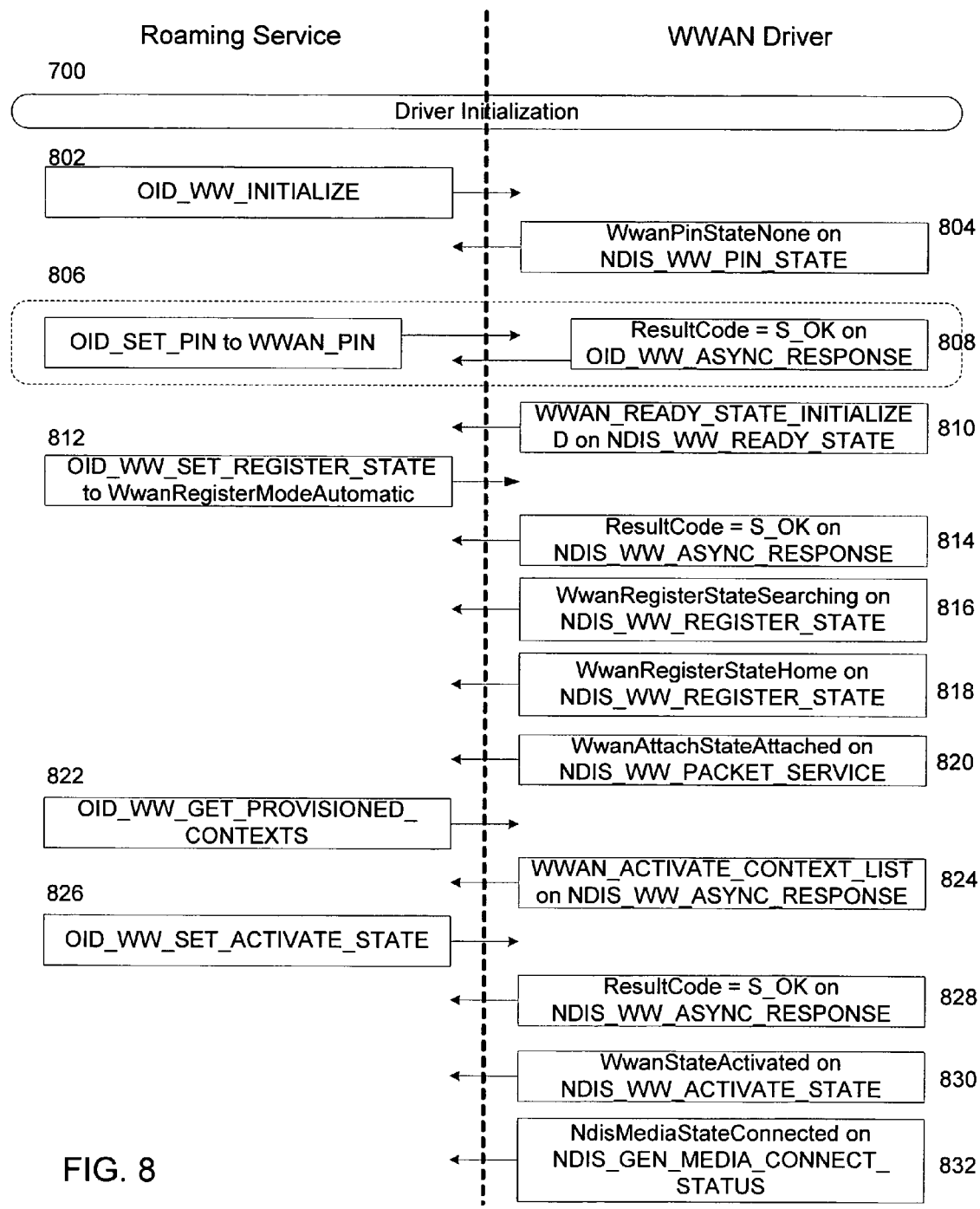
FIG. 8 is a modified flow diagram illustrating initialization of a WWAN device, in accordance with an embodiment of the invention.

FIG. 8 illustrates an example of initializing a WWAN device by using OIDs, in accordance with an embodiment of the invention. The WWAN device to be initialized by this procedure could be a GPRS device, CDMA-based device, or other WWAN device, and could either require the user to enter a PIN or not. The general procedure begins with initialization of the device driver in step 700, as described with reference to FIG. 7. The driver initialization is completed before the Roaming Service calls any WWAN OIDs. The Roaming Service initializes the protocol stack and SIM, if present, using OID_WW_INITIALIZE in step 802. Once this command is received by the device driver, it may begin sending ready state indications back to the Roaming Service. The device driver indicates that no PIN is required with the WwanPinStateNone parameter on NDIS_WW_PIN_STATE in step 804.

Alternatively, the device driver indicates that a PIN is required with the WwanPinStateNeedPin parameter. A PIN may be required, for example, to unlock a SIM. In this case, the Roaming Service sends a PIN by setting the WWAN_PIN field of OID_WW_SET_PIN in step 806. This is an asynchronous request, and the driver later indicates its receipt and completion of the set operation with ResultCode=S_OK on NDIS_WW_ASYNC_RESPONSE in step 808.

The example continues with the driver indicating it is in a ready state with NDIS_WW_READY_STATE in step 810. The Roaming Service tells the driver to power up the transceiver and attempt registration by using OID_WW_SET_REGISTER_STATE in step 812. The driver indicates its receipt and completion of the set operation with ResultCode=S_OK on NDIS_WW_ASYNC_RESPONSE in step 814. The driver indicates it is searching for a provider using NDIS_WW_REGISTER_STATE in step 816. It then indicates that the device is on a home provider, using NDIS_WW_REGISTER_STATE in step 818. When the device has packet attached, the driver indicates to the Roaming Service using NDIS_WW_PACKET_SERVICE in step 820. Alternatively, if the WWAN device is a CDMA-based device, WWAN_DATA_CLASS_1XRTT is returned using NDIS_WW_PACKET_SERVICE, since CDMA does not support the attach notion.

In the example of FIG. 8, contexts are provisioned by the WWAN service provider, and the Roaming Service asks for those provisioned contexts using OID_WW_GET_PROVISIONED_CONTEXTS in step 822. The driver indicates a list of provisioned contexts with a WWAN_ACTIVATION_CONTEXT_LIST parameter of NDIS_WW_ASYNC_RESPONSE in step 824. The WWAN_ACTIVATION_CONTEXT_LIST parameter can be, for example, an activation string, such as "#777." In this way, there is no need to select a connection type, since the device driver has notified the Roaming Service that the device has already been provisioned. Alternatively, steps 822 and 824 are omitted in a scenario where contexts are not provisioned and a user manually configures an access point string.

The example continues with the Roaming Service setting the context using the WWAN_CONTEXT parameter of OID_WW_SET_ACTIVATE_STATE in step 826. The device driver indicates it has activated the context with ResultCode=S_OK on NDIS_WW_ASYNC_RESPONSE in step 828. The driver then indicates the WWAN state is activated with NDIS_WW_ACTIVATE_STATE in step 830. The driver indicates that it can now service incoming and outgoing IP packets using the NdisMediaStateConnected parameter of NDIS_OID_GEN_MEDIA_CONNECT_STATUS in step 832.

Figure 9:
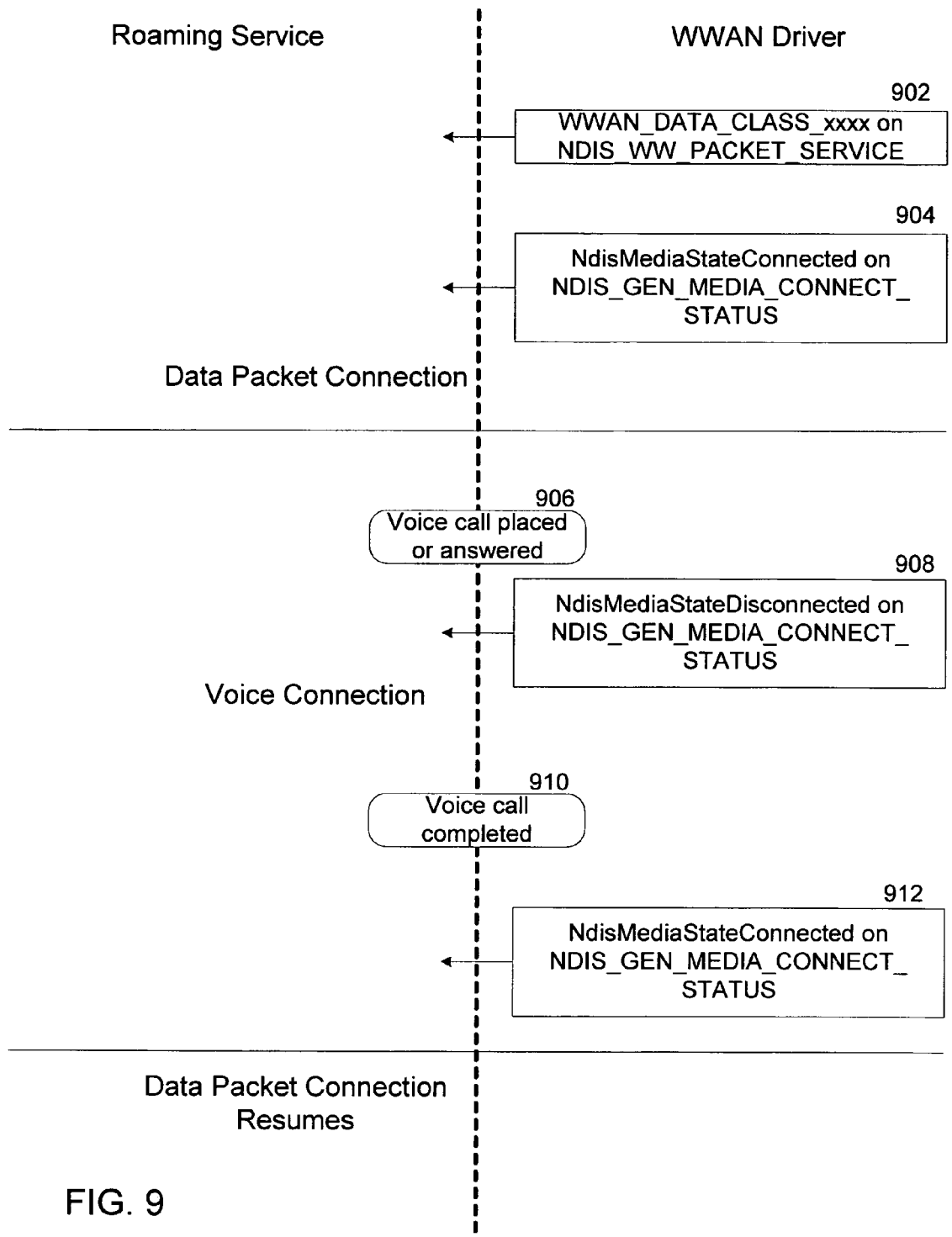
FIG. 9 is a modified flow diagram illustrating a voice call being serviced by a WWAN device using object identifiers during a packet connection, in accordance with an embodiment of the invention.

FIG. 9 illustrates an example of a voice call being serviced by a WWAN device using OIDs during a packet connection, in accordance with an embodiment of the invention. The device driver indicates the type of service the device is using (GPRS, CDMA, etc.) using NDIS_WW_PACKET_SERVICE in step 902. For GPRS, the WWAN_DATA_CLASS_GPRS parameter is used. For CDMA, the WWAN_DATA_CLASS_1XRTT parameter is used. During the course of the packet connection, the driver indicates it is connected with the NdisMediaSateConnected parameter on NDIS_GEN_MEDIA_CONNECT_STATUS in step 904. When a voice call is later placed or answered on the device in step 906, the driver indicates it is in a disconnected state using NDIS_GEN_MEDIA_CONNECT_STATUS in step 908. When the voice call completes in step 910, the driver indicates it is again in a connected state with NDIS_GEN_MEDIA_CONNECT_STATUS in step 912, and the packet connection resumes.

Figure 10:
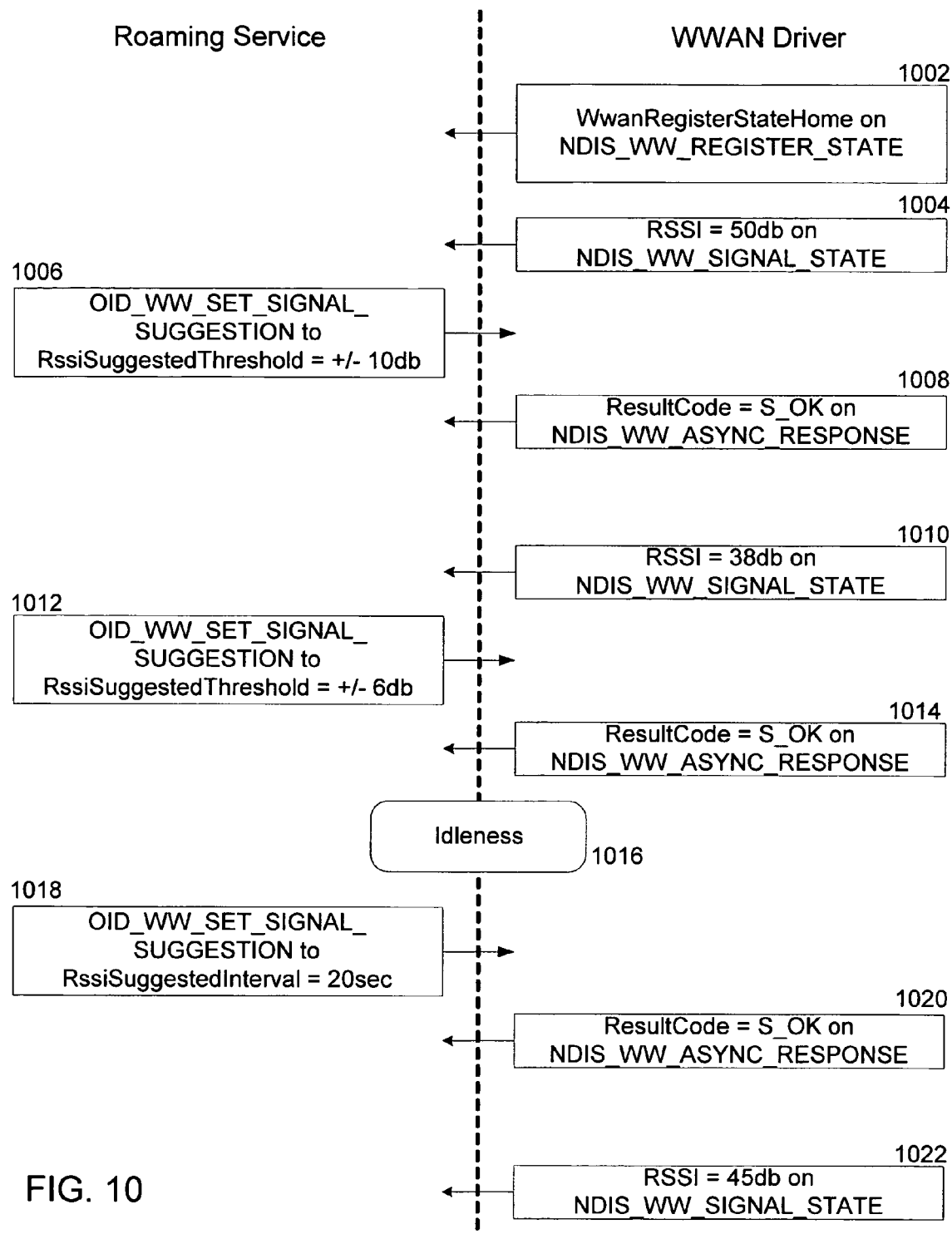
FIG. 10 is a modified flow diagram illustrating control and monitoring of signal strength using object identifiers, in accordance with an embodiment of the invention.

FIG. 10 illustrates an example of controlling the frequency of signal strength monitoring, in accordance with an embodiment of the invention. The driver indicates that the device is on a home provider, using NDIS_WW_REGISTER_STATE in step 1002. The drive indicates its current signal state—50 db in this example—using NDSI_LWW_SIGNAL_STATE in step 1004. The Roaming Service suggests a threshold within which the driver does not need to notify the Roaming Service by setting OID_WW_SET_SIGNAL_SUGGESTION in step 1006. In this example, the Roaming Service suggests a threshold range of ±10 db because the current reported signal strength of 50 db is sufficiently high. The driver responds with ResultCode=S_OK on NDIS_WW_ASYNC_RESPONSE in step 1008, since the OID_WW_SET_SIGNAL_SUGGESTION was sent by the Roaming Service as an asynchronous command. When the signal strength eventually drops below the threshold, the driver indicates the value using NDIS_WW_SIGNAL_STATE in step 1010. In the example, the signal has dropped to 38 db. Once the drop has been indicated, in some embodiments the driver ceases to report further indications of signal strength drops. The Roaming Service sets a new threshold using OID_WW_SET_SIGNAL_SUGGESTION in step 1012. In this example, the new threshold is ±6 db. The driver responds with ResultCode=S_OK on NDIS_WW_ASYNC_RESPONSE in step 1014. After some period of device idleness 1016, the Roaming Service suggests an increased minimum time interval for the driver to indicate the signal state using the RssiSuggestedInterval parameter of OID_WW_SET_SIGNAL_SUGGESTION in step 1018. In this example, the suggested interval is 20 seconds. The driver responds with ResultCode=S_OK on NDIS_WW_ASYNC_RESPONSE in step 1020. In step 1022, the driver indicates that the signal strength—45 db in this example—is outside the suggested threshold values, using NDIS_WW_SIGNAL_STATE.

Figure 11:
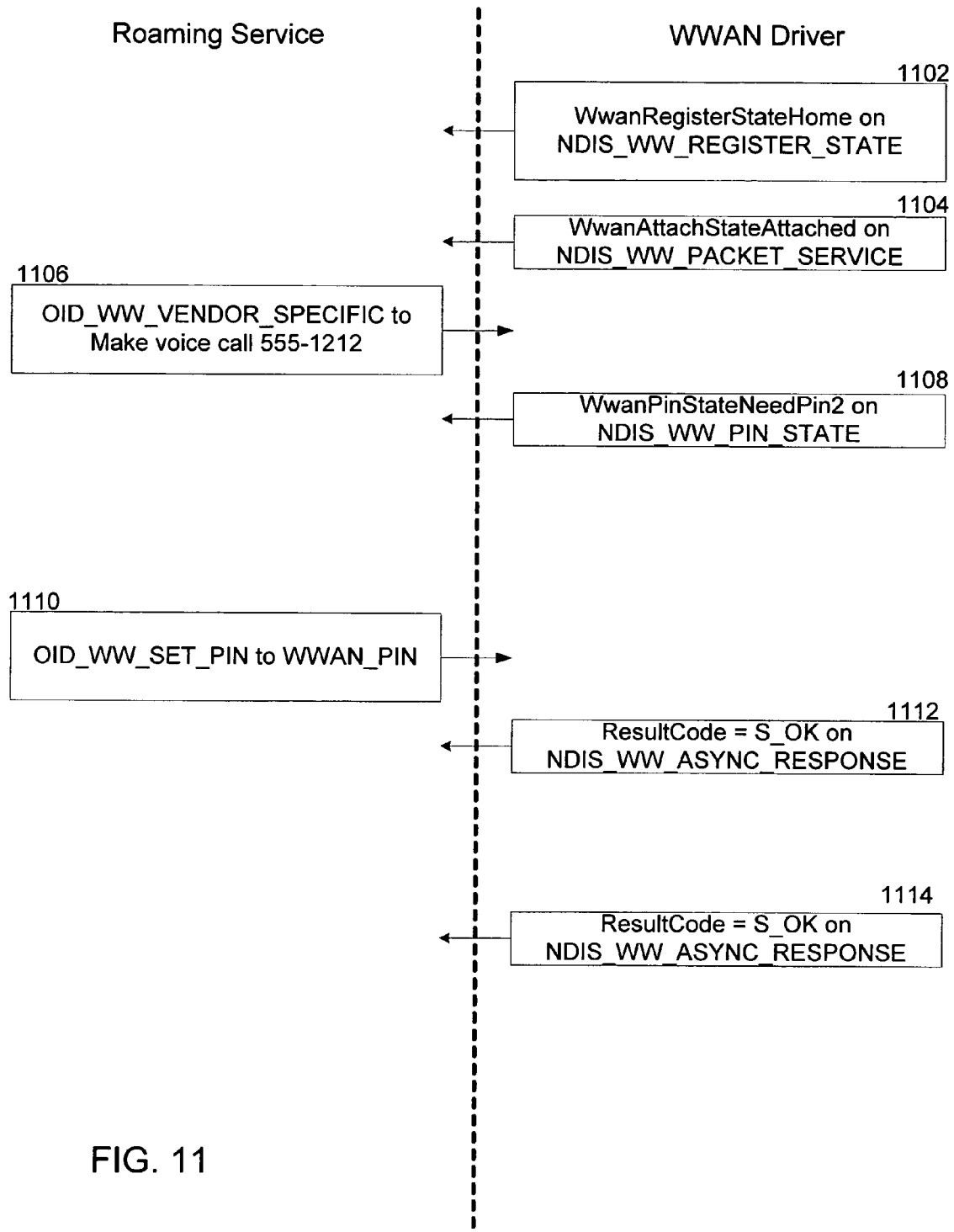
FIG. 11 is a modified flow diagram illustrating performance of an operation that requires a SIM password using object identifiers, in accordance with an embodiment of the invention.

FIG. 11 illustrates an example of performing an operation that requires a SIM password, in accordance with an embodiment of the invention. In this example, a user attempts to make a voice call with the WWAN device, but the device requires PIN2 clearance. The driver indicates that the device is on a home provider, using NDIS_WW_REGISTER_STATE in step 1102. The driver indicates to the Roaming Service that the device has packet attached NDIS_WW_PACKET_SERVICE in step 1104. When the user attempts to make a voice call, the Roaming Service sends a custom OID_WW_VENDOR_SPECIFIC to the driver in step 1106. Before sending the asynchronous result, however, the driver indicates that PIN2 is needed, using NDIS_WW_PIN_STATE in step 1108. The Roaming Service sends the PIN using OID_WW_SET_PIN in step 1110. The driver responds with ResultCode=S_OK on NDIS_WW_ASYNC_RESPONSE in step 1112, indicating that PIN2 is now clear. The driver then responds with another ResultCode=S_OK on NDIS_WW_ASYNC_RESPONSE in step 1114, as an asynchronous response to the voice call command given in step 1106.

In view of the many possible embodiments to which the principles of the present invention may be applied, it should be recognized that the embodiments described herein with respect to the drawing figures are meant to be illustrative only and should not be taken as limiting the scope of the invention. For example, those of skill in the art will recognize that the illustrated embodiments can be modified in arrangement and detail without departing from the spirit of the invention. Although the invention is described in terms of software modules or components, those skilled in the art will recognize that such may be equivalently replaced by hardware components. Therefore, the invention as described herein contemplates all such embodiments as may come within the scope of the following claims and equivalents thereof.

What is claimed is:

1. A system for using a user-mode module to kernel-mode driver interface to send commands to and receive information from a kernel-mode wireless wide area network (WWAN) device driver, the system comprising computer-executable modules encoded on a computer-storage medium, the modules comprising:
    a user-mode entity for sending an object identifier (OID) from a first set of object identifiers (OIDs), through a user-mode module to kernel-mode driver interface, to the WWAN device driver and for receiving an OID from a second set of OIDs, through the user-mode module to kernel-mode driver interface, from the WWAN device driver;
    wherein, after sending the OID from the first set, the user-mode entity is permitted to send further OIDs from the first set to the WWAN device driver through the user-mode module to kernel-mode driver interface, prior to receiving a response from the WWAN device driver,
    wherein the second set of OIDs comprises OIDs for indicating to the user-mode entity that a WWAN device associated with the WWAN device driver has been provisioned by a WWAN service provider.

2. The system of claim 1 wherein the WWAN device driver controls a GSM-based device.

3. The system of claim 1 wherein the WWAN device driver controls a CDMA-based device.

4. The system of claim 1 wherein the WWAN device driver controls a CDMA or GSM-based device.

5. The system of claim 1 wherein the first and second sets of OIDs comprise OIDs for authentication with information from a SIM.

6. The system of claim 1 wherein the first and second sets of OIDs comprise OIDs for authentication with a PIN.

7. The system of claim 6 wherein the PIN is used in conjunction with a voice call.

8. The system of claim 1 wherein the first and second sets of OIDs comprise OIDs for managing a signal strength range threshold.

9. The system of claim 8 wherein the first set of OIDs comprises OIDs sendable by the user-mode entity to establish a signal strength range threshold, and wherein the second set of OIDs comprises OIDs receivable from the WWAN device driver for indicating the signal strength is outside the established signal strength range threshold.

10. The system of claim 1 wherein the first and second sets of OIDs comprise OIDs for managing a signal strength reporting interval.

11. The system of claim 10 wherein the first set of OIDs comprises OIDs sendable by the user-mode entity to establish a signal strength reporting interval, and wherein the second set of OIDs comprises OIDs receivable from the WWAN device driver with the minimum frequency of the established signal strength reporting interval.

12. A method of operating a computing machine comprising a processor, the method comprising:
    executing instructions on the processor for sending from a user-mode entity a first object identifier (OED) from a first set of OIDs to a kernel-mode wireless wide area network (WWAN) device driver through a user-mode/kernel-mode interface;
    identifying, at the user-mode entity, a second OID from the first set of OIDs to be sent;
    waiting to send the second OID from the first set of OIDs until a return operation is received from the WWAN device driver;
    sending the second OID by way of the user-mode entity to the WWAN device driver through the user-mode/kernel-mode interface before receiving a third OID from a second set of OIDs from the WWAN device driver;
    after sending the second OID, sending a fourth OID by way of the user-mode entity to the WWAN device driver through the user-mode/kernel-mode interface before receiving the third OID from the second set of OIDs from the WWAN device driver;
    queuing the second and fourth OIDs at the WWAN device driver; and
    receiving the third OID.

13. The method of claim 12 further comprising sending an OID to adjust a signal strength range threshold.

14. The method of claim 12 further comprising determining, by the WWAN device driver in connection with a WWAN device, that a signal strength of the WWAN device is outside an established signal strength range threshold.

15. The method of claim 12 wherein the WWAN device driver controls a GSM-based device.

16. The method of claim 12 wherein the WWAN device driver controls a CDMA-based device.

17. The method of claim 12 further comprising receiving an OID from the device driver indicating whether or not a PIN is required.

18. The method of claim 17 wherein the user-mode entity sends an OID containing a PIN if a PIN is required.

19. The method of claim 12 further comprising receiving an OID indicating that the WWAN device driver is searching for a provider.

20. The method of claim 19 further comprising receiving an OID indicating that the WWAN device driver has packet attached.

21. The method of claim 12 further comprising sending an OID requesting a list of provisioned contexts.

22. The method of claim 21 further comprising receiving an OID with a list of provisioned contexts.

* * * * *

UNITED STATES PATENT AND TRADEMARK OFFICE
CERTIFICATE OF CORRECTION

PATENT NO. : 7,814,179 B2  Page 1 of 1
APPLICATION NO. : 10/749796
DATED : October 12, 2010
INVENTOR(S) : Alan Walter Shen et al.

It is certified that error appears in the above-identified patent and that said Letters Patent is hereby corrected as shown below:

In column 29, line 22, in Claim 12, delete "(OED)" and insert -- (OID) --, therefor.

Signed and Sealed this
Twenty-sixth Day of July, 2011

David J. Kappos
*Director of the United States Patent and Trademark Office*